United States Patent
Kimura et al.

(10) Patent No.: US 8,111,263 B2
(45) Date of Patent: *Feb. 7, 2012

(54) VIDEO DISPLAY DEVICE AND COLOR TEMPERATURE CORRECTION METHOD FOR THE SAME

(75) Inventors: Katsunobu Kimura, Yokohama (JP); Takaaki Matono, Yokohama (JP); Haruki Takata, Yokohama (JP); Takeshi Sakai, Yokohama (JP); Wataru Kato, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 108 days.

This patent is subject to a terminal disclaimer.

(21) Appl. No.: 12/405,966

(22) Filed: Mar. 17, 2009

(65) Prior Publication Data

US 2009/0244107 A1  Oct. 1, 2009

Related U.S. Application Data

(63) Continuation of application No. 11/177,688, filed on Jul. 7, 2005, now abandoned, which is a continuation of application No. 10/093,668, filed on Mar. 7, 2002, now Pat. No. 7,084,880.

(30) Foreign Application Priority Data

Jul. 27, 2001 (JP) ................................ 2001-226987

(51) Int. Cl.
*G09G 5/02* (2006.01)
(52) U.S. Cl. .......................... 345/589; 345/593; 345/603
(58) Field of Classification Search ............... 345/55, 345/204, 589–591, 593, 600, 603–605, 690; 348/223.1, 225.1, 228.1, 674, 675
See application file for complete search history.

(56) References Cited

U.S. PATENT DOCUMENTS

| 5,177,599 A | * | 1/1993 | Takagi et al. ............. 348/228.1 |
| 5,436,673 A | * | 7/1995 | Bachmann et al. ........... 348/645 |
| 6,611,249 B1 | * | 8/2003 | Evanicky et al. ............. 345/102 |

(Continued)

FOREIGN PATENT DOCUMENTS

JP 60-180394 A 9/1985

(Continued)

OTHER PUBLICATIONS

Japan Patent Office office action for patent application JP2007-086371 (Apr. 19, 2011).

*Primary Examiner* — Seokyun Moon
(74) *Attorney, Agent, or Firm* — Kilpatrick Townsend & Stockton LLP

(57) ABSTRACT

A video display device that allows the color temperature of the signals in white color attributes having high luminance and low chroma saturation to be corrected with high precision is provided with a color temperature correction method so as to visually obtain a desirable white color on display. In some embodiments, the signal processing circuit can include an A/D converter to convert video signals into digitalized signals, a matrix circuit to convert the digitalized signals into luminance signals and at least two color difference signals, a hue conversion circuit to obtain hue signals from the color difference signals, a hue correction circuit to correct hue signals, a chroma saturation conversion circuit to obtain chroma saturation signals from color difference signals, a chroma saturation correction circuit to correct chroma saturation signals and a color temperature correction circuit to perform the color temperature correction on the respective hue and chroma saturation signals.

15 Claims, 17 Drawing Sheets

U.S. PATENT DOCUMENTS 6,697,127 B2 * 2/2004 Suzuki .......................... 348/674

FOREIGN PATENT DOCUMENTS

| JP | 63-153986 A | 6/1988 |
| JP | 05-115018 A | 5/1993 |
| JP | 10-248024 A | 9/1998 |
| JP | 3072656 | 6/2000 |
| JP | 2001-125557 A | 5/2001 |
| JP | 2001-134226 A | 5/2001 |

* cited by examiner

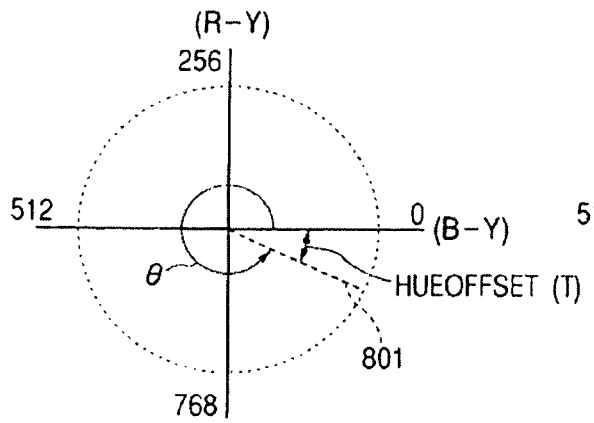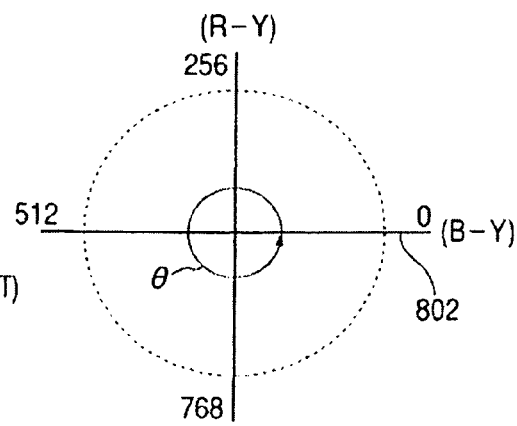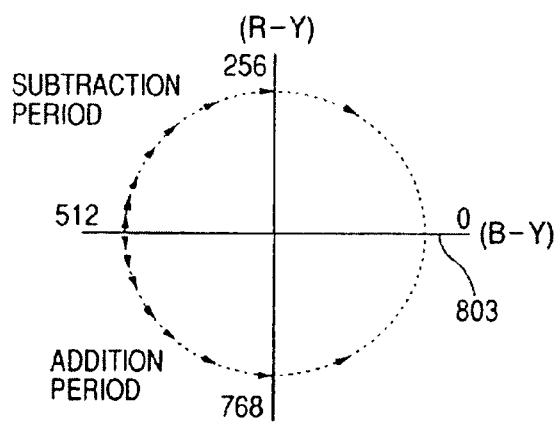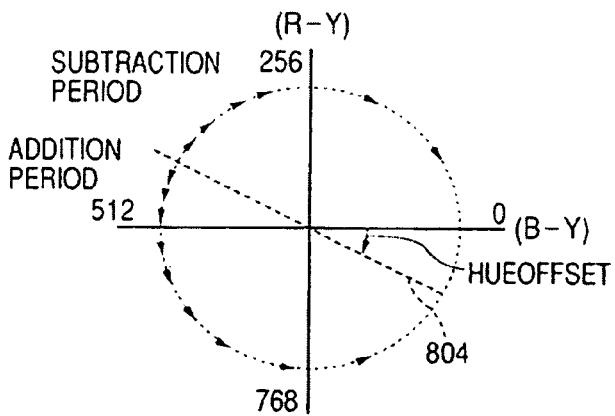

VIDEO DISPLAY DEVICE AND COLOR TEMPERATURE CORRECTION METHOD FOR THE SAME

CROSS-REFERENCES TO RELATED APPLICATIONS

This application is a continuation of U.S. Ser. No. 11/177,688 filed on Jul. 7, 2005, which is a continuation of U.S. Ser. No. 10/093,668 filed on Mar. 7, 2002, which claims priority to Japanese Application No. 2001-226987 filed on Jul. 27, 2001.

BACKGROUND OF THE INVENTION

The present invention relates to a method for correcting the color temperature of the picture signals and a picture display device of such as a color television receiver and a liquid crystal projector.

In such display devices as mentioned above, it is generally known that an especially bright white color is rendered bluish to some extent for display thereon by increasing the color temperature thereof so as to make the pictures visually impressive and beautiful.

It is disclosed in the Japanese Unexamined Patent Publication 23414/1995 that portions in such achromatic colors as white and gray are detected based on the maximum values of three types of color difference signals R–Y, G–Y and B–Y in order to enhance the level of the B–Y so as to strengthen the blue component of such portions and increase the color temperature thereof.

SUMMARY OF THE INVENTION

However, the actual pictures include besides a pure white color a color approximate to white, which color is made with a slight mixture of other colors with the pure white color and is hereinafter referred to as approximate white color and also as white attributes together with the pure white color. It often happens that what is seen in white in such natural pictures as scenery and portraits is in actual mostly occupied by the approximate white rather than the pure white color. In the prior art as mentioned above, it is arranged such that only the color temperature of such portions in achromatic colors is increased so that color temperature correction is performed only on the region in pure white of the natural pictures, most of which composition is occupied by such approximate white as mentioned above. Accordingly, visual effect is not brought by the rise of the color temperature of such portions to much extent, when the pictures are seen as a whole.

Further, there is a case where it appears more beautiful when the approximate white or slight yellow attribute to the pure white color that is of low color temperature is altered with bluish attribute to the pure white color that is of high color temperature. Moreover, where the display device provided with such color reproduction characteristics as displaying the portions of a picture in white attributes by a lower color temperature than the color temperature of the relevant video signals, such as displaying the pure white color in yellowish attribute thereto, it is visually preferable to increase the color temperature of not only the pure white color, but also that of the approximate white color, the color temperature of which is low. However, the above prior art is not so arranged as increasing the color temperature of the approximate white color, which does not meet such requirement as mentioned above.

In view of the above inconveniences as encountered with the prior art, the present invention is to provide a video display device that more appropriately corrects the color temperature of the pictures so as to display them in more preferred colors and a color temperature correction method for the same.

The video display device according to the present invention is characterized in being provided with a signal processing circuit provided with a color temperature correction circuit that corrects the color temperature of the input video signals of the white attributes including the approximate white color having a given luminance or above and a given chroma saturation or below Concretely, the signal processing circuit comprises an A/D converter that converts an input video signal into a digital signal, a matrix circuit that converts the digital signal as output from the A/D converter into a luminance signal and at least two color difference signals, a hue processing circuit to obtain a hue signal on the basis of the color difference signal as output from the matrix circuit, a chroma saturation processing circuit to obtain a chroma saturation signal on the basis of the color difference signal and a microcomputer, wherein the color temperature correction circuit is characterized in performing color temperature correction processing for the purpose of increasing the color temperature of the hue signal as output from the hue processing circuit and the chroma saturation signal as output from the chroma saturation circuit, which signals belong to the white attributes, or for the purpose of approximating the color temperature of the white attributes to that of blue color.

The color temperature correction circuit comprises a first color temperature correction section that performs the color temperature correction on the hue signal as output from the hue processing circuit, which signal belongs to the white attributes, a second color temperature correction section that performs the color temperature correction on the chroma saturation signal as output from the chroma saturation processing circuit, which signal belongs to the white attributes, a first selection circuit that selects and outputs either a signal as output from the first color temperature correction section or a hue signal as output from the hue processing circuit and a second selection circuit that selects and outputs either a signal as output from the second color temperature correction section or the hue signal as output from the hue processing circuit. Further, the first and second selection circuits are arranged such that they select the signals as output from the first and second color temperature correction sections where the region of the input video signal, which region belongs to the white attributes and has a given luminance or above and a given chroma saturation or below, is detected.

Further, the color temperature correction method according to the present invention is characterized in comprising a step of converting an input video signal into a digital signal, a step of separating the digital signal into a luminance signal and a color difference signal, a step of separating the color difference signal in to a hue signal and a chroma saturation signal and a step of performing color temperature correction processing on the hue and the chroma saturation signals, which signals belong to the white attributes and have a given luminance or above and a given chroma saturation or below, so as to increase the color temperature of the same signals. The step of performing the color temperature correction processing may further include a step of approximating the hue of the signals belonging to the white attributes to blue color and a step of increasing the chroma saturation of the signals belonging thereto.

The present invention is arranged such that the color temperature correction is performed on the signal, which signal belongs to the white attributes and has a given luminance or above and a given chroma saturation or below, which allows the color temperature of the signal not only in pure white, but also in the approximate white color with the slight mixture of other colors to be corrected. Thus, even though pictures like natural scenery and portraits include a lot of approximately white portions, correcting the color temperature of such approximate white color so as to increase or approximate the same color to blue allows a visually preferred white color to be obtained, with the result that more beautiful video pictures can be provided.

BRIEF DESCRIPTION OF THE DRAWINGS

FIG. 8 is a view to show the operation of the first color temperature correction section 231.

BEST MODE FOR CARRYING OUT THE INVENTION

Figure 1:
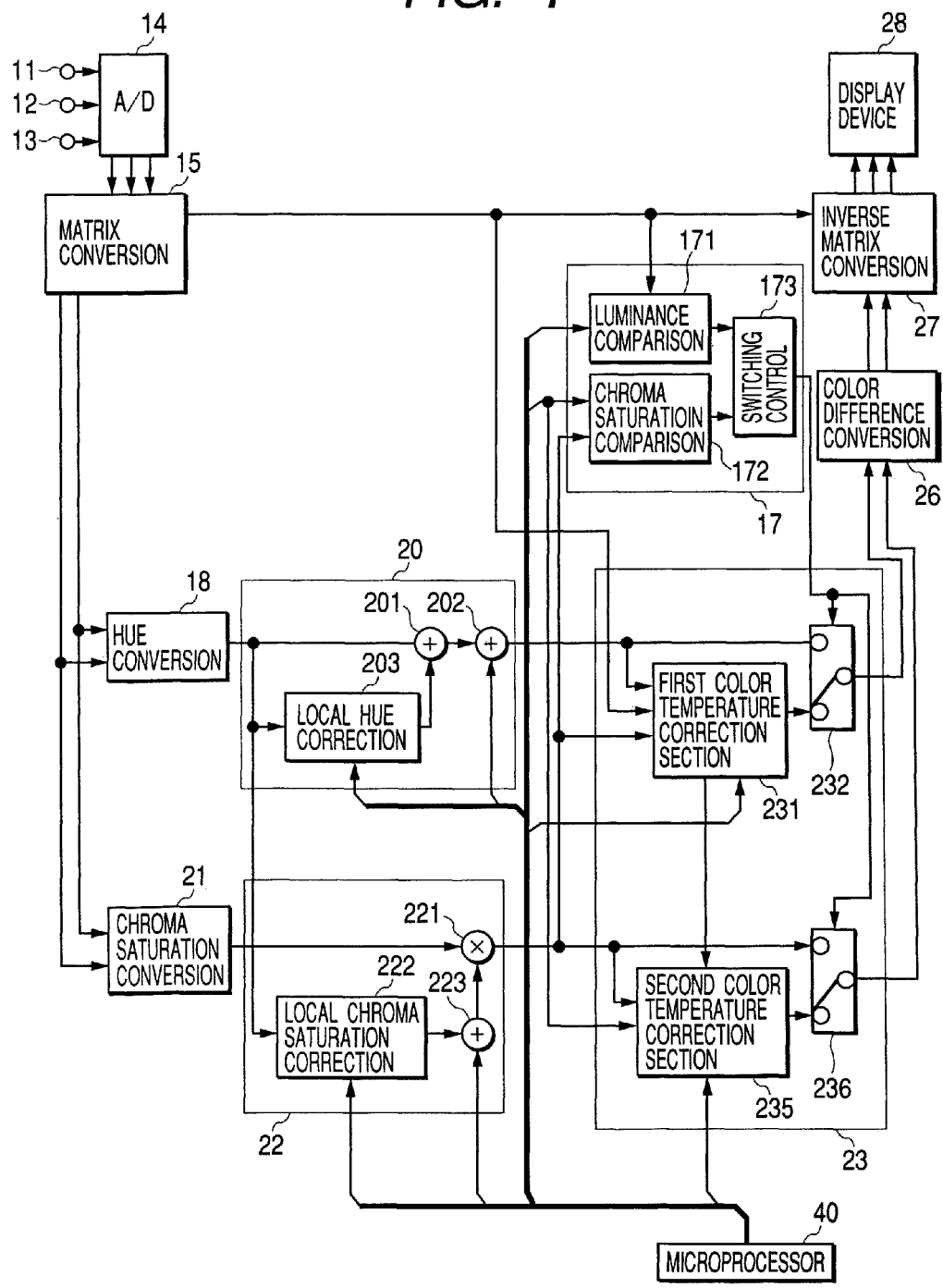
FIG. 1 is a block diagram to show one embodiment of the signal processing circuit for the video display device according to the present invention.

Hereinafter, the preferred embodiments of the present invention are described below with reference to the accompanying drawings. FIG. 1 is a block diagram to show one embodiment of the signal processing circuit for the video display device according to the present invention. The R, G and B primary colors signals, which are input to an R terminal 11, a G terminal 12 and a B terminal 13 respectively, are supplied to an A/D conversion circuit 14 so as to be converted into digital signals. A matrix conversion circuit 15 subjects the three primary colors signals (R, G, B) in digital form as output from the A/D conversion circuit 14 to matrix conversion processing so as to convert the same signals into a luminance signal Y as well as color difference signals (R−Y) and (B−Y), which luminance signal Y is output to a detection circuit 17 and an inverse matrix conversion circuit 27 respectively and which color difference signals (R−Y) and (B−Y) are output to a hue conversion circuit 18 and a chroma saturation conversion circuit 21 respectively. The hue conversion circuit 18 performs an attribute conversion operation as shown in the following equation 1, for instance, with the input (R−Y) and (B−Y) signals in use so as to output a hue signal (è) in digital form.

$$è=\tan^{-1}\{(R-Y)/(B-Y)\} \quad \text{(Equation 1)}$$

On the other hand, the chroma saturation circuit 21 performs an attribute conversion operation as shown in the following equation 2, for instance, with the input (R−Y) and (B−Y) signals in use so as to output a chroma saturation signal (S) in digital form.

$$S=\sqrt{(R-Y)^2+(B-Y)^2} \quad \text{(Equation 2)}$$

Figure 2:
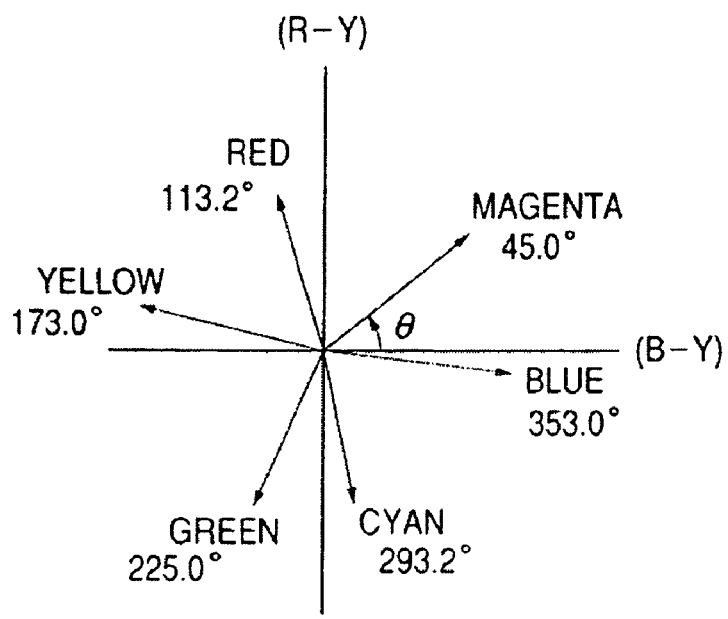
FIG. 2 is a view to show a hue circle that denotes colors in vector.

Hereafter, the hue and chroma saturation signals are described. As shown in FIG. 2, when the (B−Y) signal is taken on the horizontal axis while the (R−Y) signal is taken on the vertical axis, colors are represented with vectors. The direction of the respective vectors or an angle that the horizontal axis (B−Y) makes with the respective vectors indicates a hue (è) and the largeness of the respective vectors indicates chroma saturation (S). What colors are represented with vectors is called a hue circle, which is generally known. In this hue circle, for instance, magenta is represented with a vector locating by 45° apart from the (B−Y) axis as shown in FIG. 2. That is, the hue (è) of the magenta is at 45°. The chroma saturation (S) is determined by the largeness of the respective vectors wherein the larger the vector is, the denser it is while the smaller it is, the dimmer it is. If the largeness of a vector is null, it shows that there is no color in issue. The hue of red, yellow, green, cyan, blue respectively is at 113.2°, 173.0°, 225.0°, 293.2° and 353.0°. The hue conversion circuit 18 outputs a hue signal in digital form wherein the same circuit outputs the range of hue from 0° to 359.9° as the digital signals ranging from 0 to 1023, given that the digital signal is in 10 bits precision. That is, this bit precision divides the hue of 360° by 1024 that is equivalent to 2 to the tenth power. The 1LSB of the hue digital signal amounts to approximately 0.35°.

Figure 3:
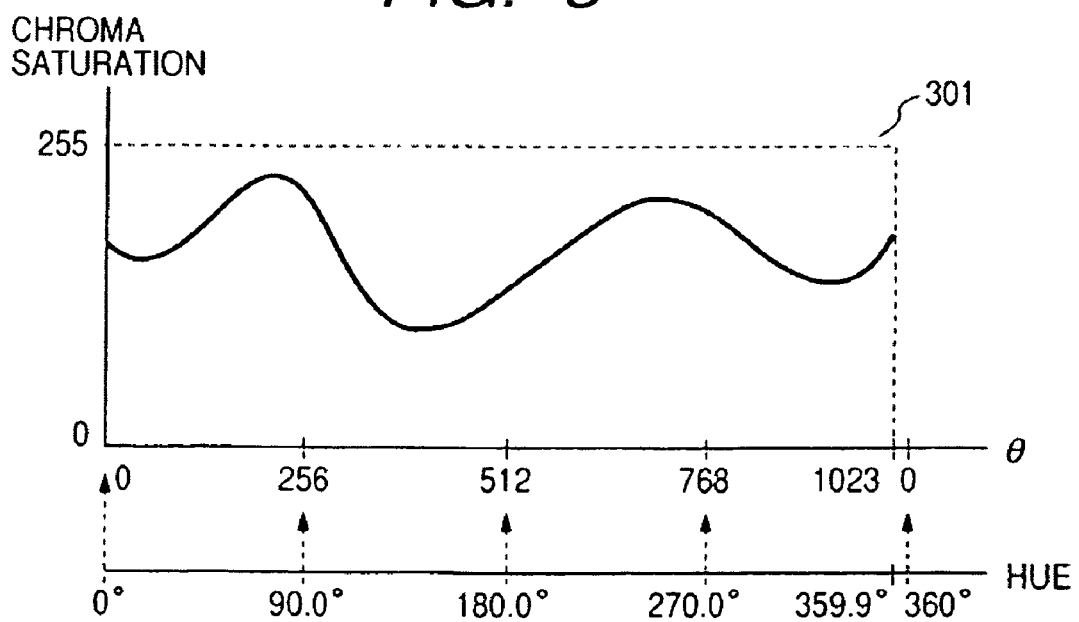
FIG. 3 is a view to show one example of the correlation between a hue signal and a chroma saturation signal.

FIG. 3 is a view to supplement what is described above, in which one example of the correlation between the hue signal and the chroma saturation signal is shown by a waveform 301. FIG. 3 takes the hue signal è (in 10 bits precision) on the horizontal axis thereof while taking the chroma saturation signal (8 bits in precision) on the vertical axis thereof. The representative hues (B−Y), (R−Y), −(B−Y) and −(R−Y) are shown therein as 0, 256, 512 and 768 respectively.

On the other hand, the chroma saturation circuit 21 outputs the chroma saturation signals that indicate the largeness of the vectors corresponding to the hue signals ranging from 0 to 1023 as the corresponding digital signals. Given that this chroma saturation signals in digital form are in 8 bits precision, the chroma saturation circuit 21 outputs the corresponding digital signals ranging from 0 to 255.

The digitalized hue signals as output from the hue conversion circuit 18 are input to a hue correction circuit 20, which circuit is provided with a local hue correction circuit 203 as well as adders 201 and 202 so as to correct and output the digitalized hue signals as input within the specific range of hue. The range of hue as corrected and the degree of correction as effected by the hue correction circuit 20 are determined by the variety of the set values as output from a microcomputer 40. Then, the digitalized chroma saturation signals as output from the chroma saturation circuit 21 are input to a chroma saturation correction circuit 22, which circuit is provided with a chroma saturation coefficient generation circuit 222 as well as a multiplier 221 and an adder 223 so as to correct and output the digitalized chroma saturation signals as input within the specific range of chroma saturation. The range of chroma saturation as corrected and the degree of correction as effected by the chroma saturation circuit are determined by the variety of the set values as output from the microcomputer 40.

The digitalized hue signals as corrected (hereinafter, referred to as corrected hue signals) by the hue correction circuit 20 and the digitalized chroma saturation signals as corrected (hereinafter, referred to as corrected chroma saturation signals) are input to a color temperature correction circuit 23, which circuit is the characteristic portion of the present invention and is arranged such that color temperature correction is performed on the corrected hue and chroma saturation signals in the white attributes having a given luminance or above and a given chroma saturation or below as defined by the maximum set value of chroma saturation ST and the minimum set value of luminance YB that are supplied from the microcomputer 40. Further, the color temperature correction circuit 23 is provided with a first color temperature correction section 231 that performs color temperature correction on the corrected hue signal, a first selection circuit 232 that selects and outputs either a signal as output from the first color temperature correction circuit 231 or the corrected hue signal as output from the hue correction circuit 20, a second color temperature correction section 235 that performs color temperature correction on the corrected chroma saturation signal and a second selection circuit 236 that selects either a signal as output from the second color temperature correction section 235 or the corrected chroma saturation signal as output from the chroma saturation circuit 22. The first and second selection circuits 232 and 236 select and output the signals as output from the first color correction section 231 and the second color correction section 235 respectively where the input video signals are of a given luminance or above and a given chroma saturation or below while otherwise selecting and outputting the corrected hue and chroma saturation signals respectively. The selection operation of the signals as mentioned above by means of the first and second selection circuits 232 and 236 is performed on the basis of the control signals as output by a detection circuit 17.

The detection circuit 17 detects whether the input vide signals are those in the white attributes having a given luminance or above and a given chroma saturation or below. Concretely, the detection circuit 17 comprises a luminance comparison circuit 171 that compares a luminance signal as output from a matrix conversion circuit 15 with the minimum value of luminance YB as set by the microcomputer 40, a chroma saturation comparison circuit 172 that compares the corrected chroma saturation signal with the maximum value of chroma saturation ST as set by the microcomputer and a switching control circuit 173 to which the signals as output from the luminance comparison circuit 171 and the chroma saturation comparison circuit 172 are input, on the basis of which signals the switching control circuit determines whether the input video signals meet the condition that they are of a given luminance or above and a given chroma saturation or below so as to output the control signals to the first and second selection circuits 232 and 236 where such condition is met. That is, where such condition as mentioned above is met, the switching control circuit 173 is arranged such that the first and second selection circuits 232 and 236 select and output the signals as output from the first and second color correction sections 231 and 235 respectively.

The signals as output from the first and second selection circuits 232 and 236 are input to a color difference conversion circuit 26, which circuit generates the color difference signals (R−Y) and (B−Y) from those output signals and outputs them. The color difference signals as output from the color difference conversion circuit 26 are input to an inverse matrix conversion circuit 27 so as to be converted into three primary colors signals of R, G and B. The three primary colors signals as output from the inverse matrix conversion circuit 27 are supplied to a display device 28, which device displays video pictures on the basis of those three primary colors.

Figure 4A:
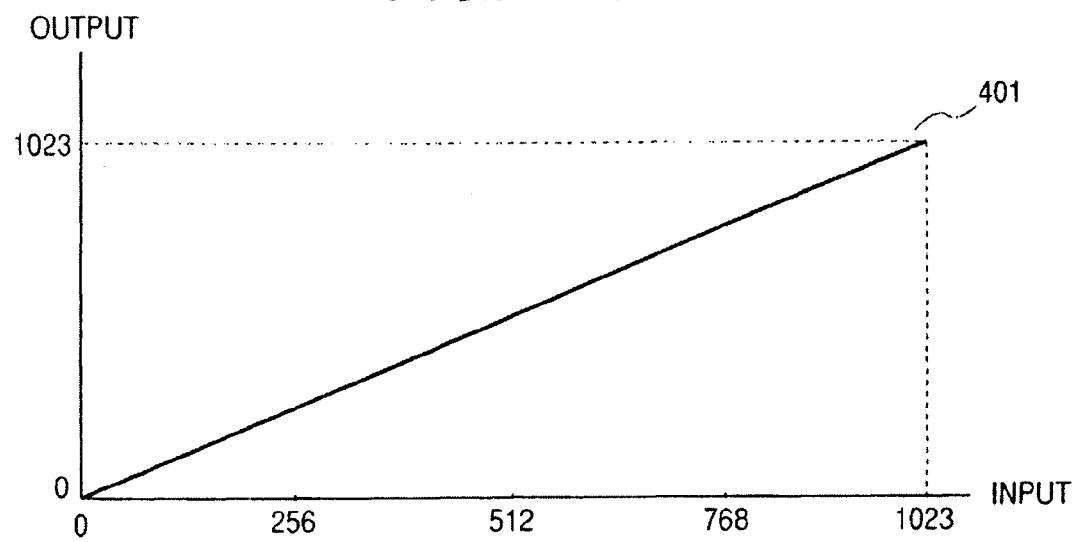
FIG. 4 is a view to show the input and output characteristics of the respective sections of the hue correction circuit 20.
Figure 4B:
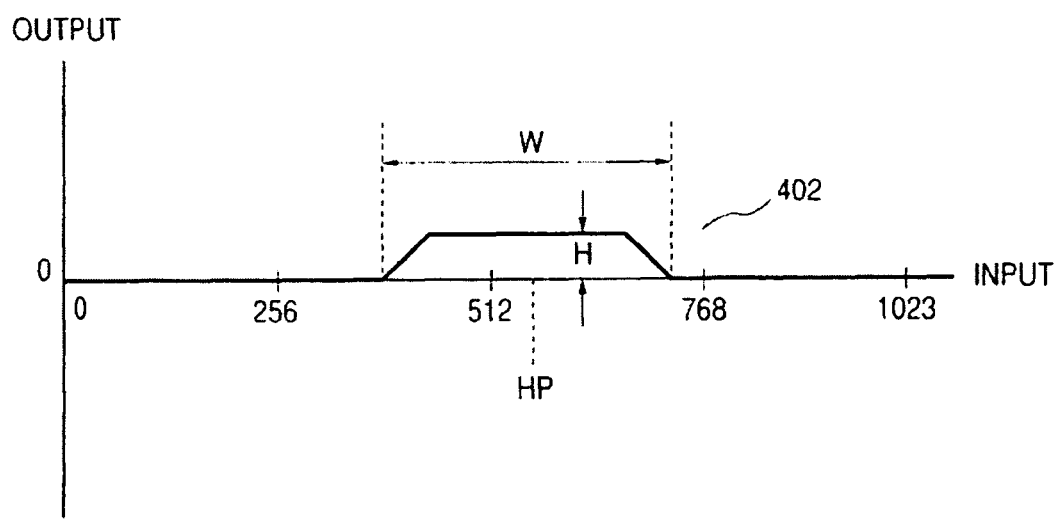
Figure 5A:
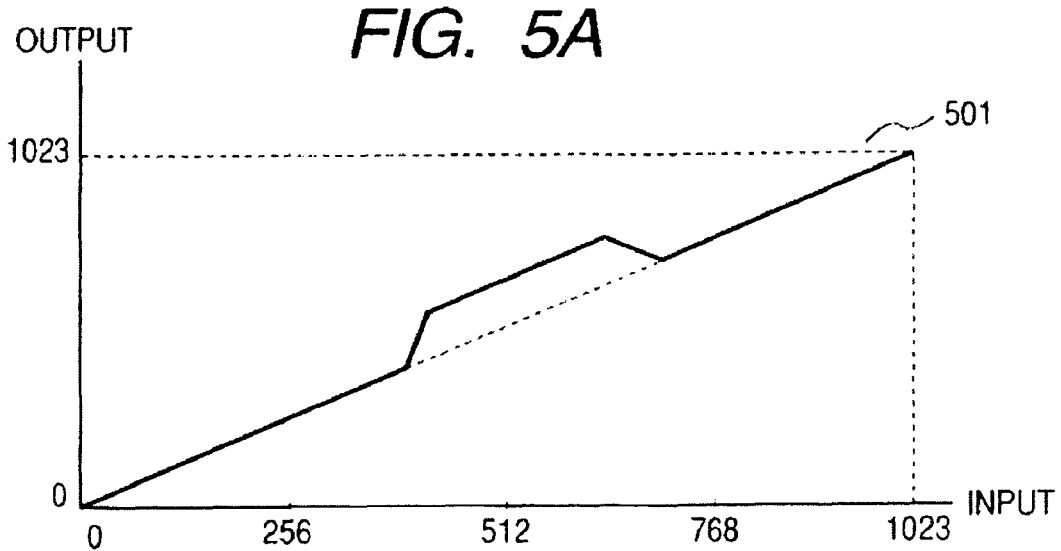
FIG. 5 is a view to show the input and output characteristics of the respective sections of the hue correction circuit 20.
Figure 5B:
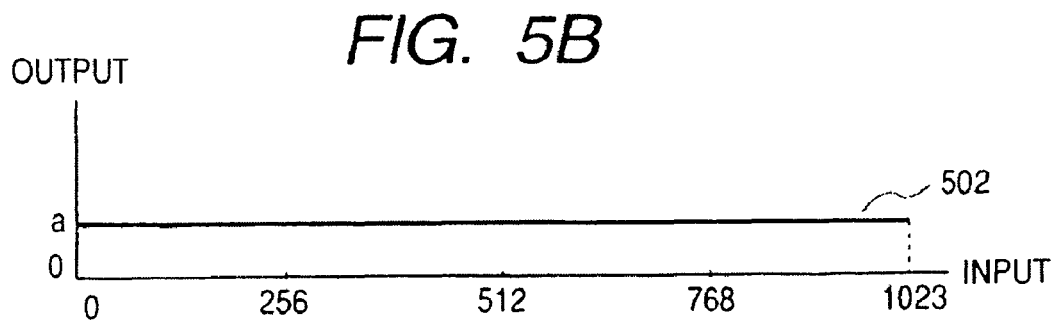

Then, the respective sections of the device are in more details described below. Firstly, the hue correction circuit 20 is described in details with reference to FIGS. 4 and 5. The hue correction circuit, where there is no addition to the digitalized hue signal at the adders 201 and 202, is possessed with the linear input and output characteristics as shown in the straight line 401 of FIG. 4A. The digitalized hue signal as output from the hue conversion circuit 18 is input to the adder 201 and the local hue correction circuit 203 respectively. The local hue correction circuit 203, to which a mean value HP of hue, a level H thereof and a width W thereof as shown in FIG. 4B as output from the microcomputer 40 are input, decodes hue within the range of such input data so as to output a signal having a waveform as shown in 402 of FIG. 4B. The adder 201 adds the digitalized hue signal to the signal as output from the local hue correction circuit 203 having such trapezoidal waveform 402. As the result of it, the adder 201 outputs a signal having a waveform 501 that shifts by H upwards in the interval W with the middle HP thereof as shown in FIG. 5A. The degree to which the waveform shifts depends on the level H as input from the microcomputer 40. In this way, the local hue correction circuit 203 and the adder 201 variably control hue within the range as designated by the microcomputer 40 and with a level as designated by the same so as to allow hue to be locally controlled.

Figure 5C:
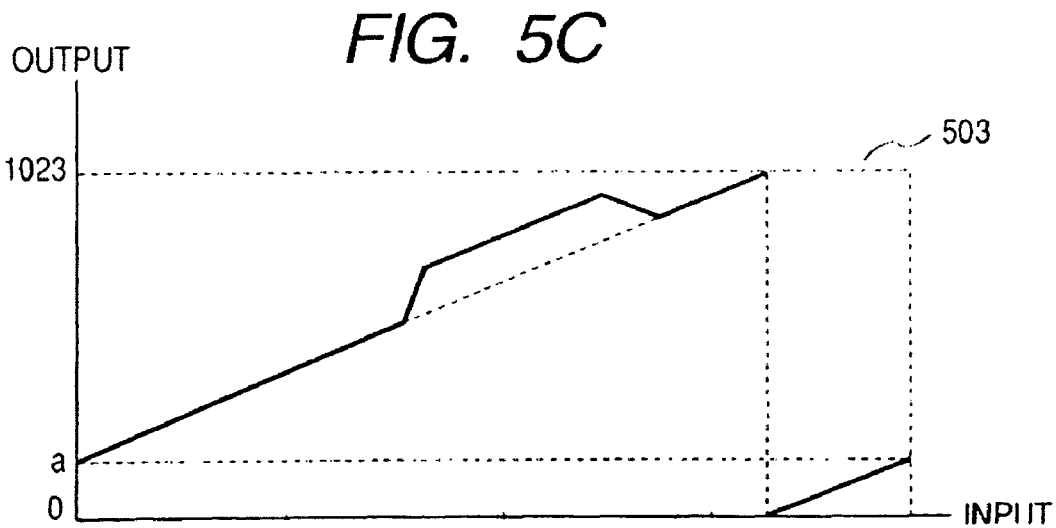

Further, the signal having the waveform 501 as output from the adder 201 is input to one terminal of the adder 202. To the other terminal of the adder 202, an offset value as output from the microcomputer 40 is input. This offset value is possessed with a given level a over the whole hue as shown in the straight line 502 of FIG. 5B. The adder 202 adds the signal as output from the adder 201 to the offset value as output from the microcomputer 40, which results that the adder 202 outputs a signal that shifts upwards the whole signal as shown in FIG. 5A by the level a of the offset value as shown in FIG. 5C with a waveform 503. In this way, the adder 202 allows the overall hue to be controlled, the function of which corresponds to a so-called tint adjustment for the purpose of adjusting the overall hue. To note, the adder 202 according to the present embodiment adopts a 10 bits adder for both input and output operations so that it overflows and returns to 0 when the addition result goes beyond 1023. Accordingly, where the addition by means of the adder 202 results in being over 1023, it outputs a value that subtracts 1023 from the addition result.

As mentioned above, the hue correction circuit 20 varies the hue signal within the range of hue as designated by the microcomputer 40 with that of another hue and outputs a signal that offsets the whole hue by a given value by setting such offset value. The use of the 10 bits digital signal for the hue signal allows s high-precision hue shift and offset control as per approximately 0.35° to be realized. Such parameters relating to the hue correction as the degree to which and the range within which the hue shifts are set by the microcomputer 40, which parameters are arbitrarily altered and adjusted. To note, there is only one range within which hue shifts according to the present embodiment, but the plurality of the local hue correction circuits 203 may be provided, the signals as output from which circuits are added so as to be input the adder 201, which allows the plural ranges of hue to be shifted independently from one another.

Figure 13A:
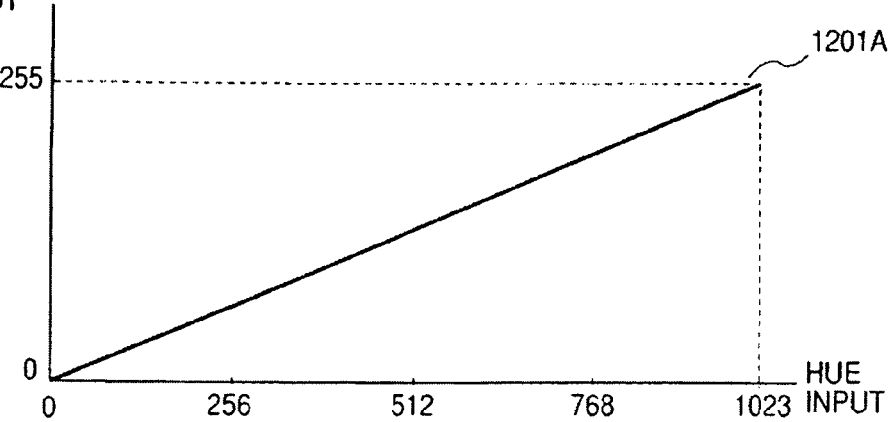
FIG. 13 is a view to show the input and output characteristics of the respective sections of the chroma saturation correction circuit 22.
Figure 13B:
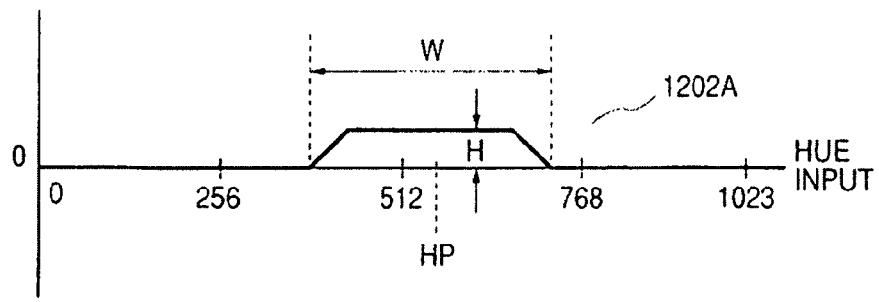
Figure 13C:
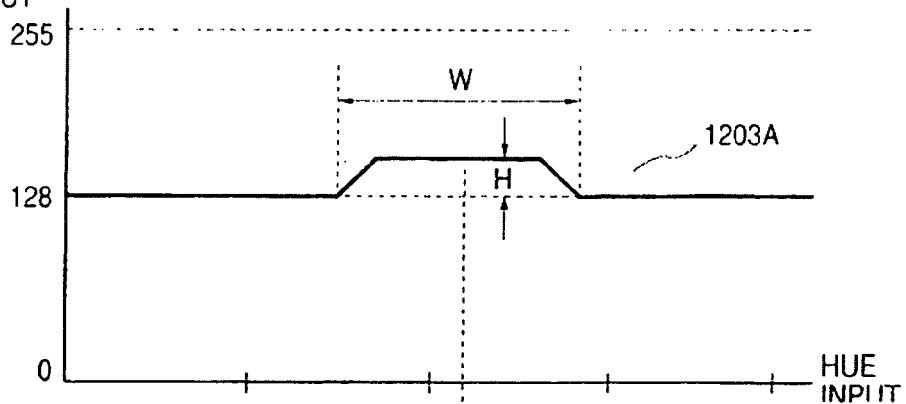

Then, the chroma saturation circuit 22 is described below in details with reference to FIG. 13. The chroma saturation circuit 22, where there is neither addition to the digitalized chroma saturation signal at an adder 223 nor multiplication performed thereon at a multiplier 221, is possessed with the linear input and output characteristics as shown in FIG. 13A with a straight line 1201A. The digitalized chroma saturation signal as output from the chroma saturation circuit 21 is input to the multiplier 221 of the chroma saturation correction circuit 22. On the other hand, the digitalized hue signal as output from the hue conversion circuit 18 is input to a local chroma saturation correction circuit 222, to which circuit a mean value HP of hue, a level H thereof and a width W thereof as designated by the microcomputer 40 and as shown in FIG. 13B are input and which circuit decodes hue within the range of the input data so as to output a correction signal for locally correcting the chroma saturation of the hue of the specific range, which signal is shown in FIG. 13B with a waveform 1202A. An adder 223 adds an offset value as output from the microcomputer 40 to a signal as output from the local chroma saturation signal correction circuit 222. As the result of it, the adder 223 outputs a chroma saturation amplification coefficient with the characteristics as shown in FIG. 13C with a waveform 1203A. Accordingly, it is the level H that determines the amplification degree of the chroma saturation signal within the specific range of hue while it is the offset value as designated by the microcomputer 40 that determines the amplification degree of the overall chroma saturation signals (or chroma saturation signals over the whole hue). This offset value is constant over the whole hue, the level of which value is set at 128 that is in the middle between the minimum value (0) and the maximum value (255) of the chroma saturation signals in the present embodiment. The signal as output from the adder 223 (chroma saturation amplification coefficient) is input to one terminal of the multiplier 221, to the other terminal of which the digitalized chroma saturation signal as output from the chroma saturation conversion circuit 21 is input. The multiplier 221, which multiplies the digitalized chroma saturation signal by the chroma saturation amplification coefficient, shifts or corrects the chroma saturation level within the specific range of hue.

In this way, the chroma saturation correction circuit 22 locally corrects the chroma saturation signal within the range of hue as designated so as to vary the density of the color within the specific range of hue, which circuit also controls the chroma saturation signals of the whole hue so as to vary the density of the color over the whole hue. This function corresponds to a so-called color adjustment. Further, such parameters relating to chroma saturation correction as the degree to which and the range within which the chroma saturation is corrected are designated by the microcomputer 40, which allows those parameters to be altered and adjusted. To note, there is only one range for chroma saturation correction in the present embodiment, but the plural local chroma saturation circuits may be provided, the signals as output from which circuits are added so as to be input to the multiplier 221, which allows the chroma saturation within the plural ranges of hue to be independently corrected.

Figure 6:
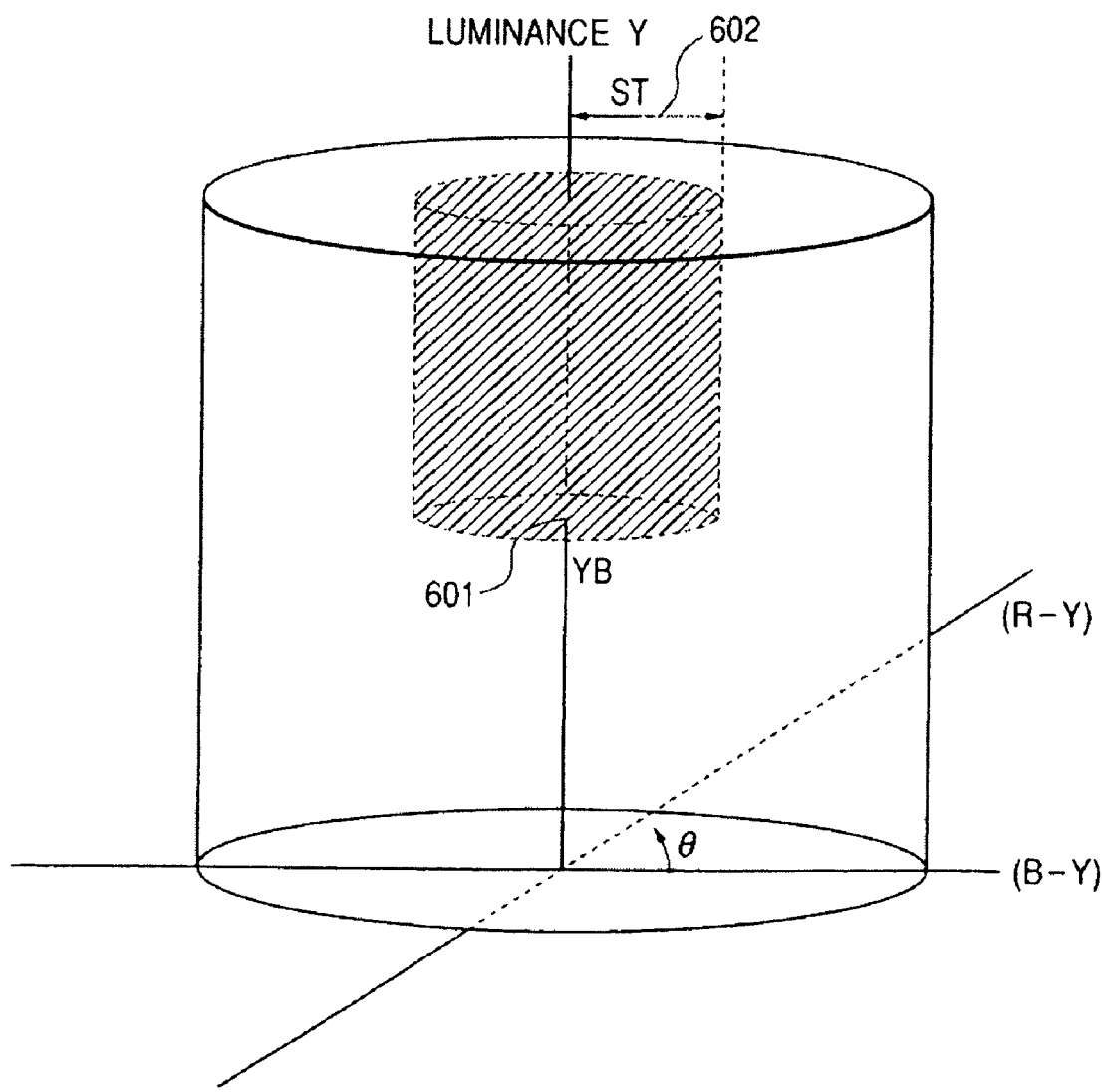
FIG. 6 is a view to show the range of the signals belonging to the white attributes as detected by the detection circuit 17.

Then, the detection circuit 17 is described below in details with reference to FIG. 6. The luminance signal Y as output from the matrix conversion circuit 15 is input to a luminance level comparison circuit 171, which circuit compares the luminance signal Y with the minimum set value of luminance YB (601) as shown in FIG. 6 so as to output a high luminance level detection signal '1' where the luminance signal Y is larger than the set value YB while to output '0', otherwise. The minimum set value of luminance YB is defined as 210 in the present embodiment, which corresponds to the 70% of the maximum luminance 100. That is, the present embodiment is intended for detecting the signals in the white attributes having 70% or more of luminance, to which value it is not necessarily limited, but may adopt other value where appropriate.

In turn, the chroma saturation signal as output from the multiplier 221 of the chroma saturation circuit 22 is input to a chroma saturation level comparison circuit 172, which circuit compares the chroma saturation signal with the maximum set value of chroma saturation ST (602) as shown in FIG. 6 so as to output a low chroma saturation level detection signal '1' where the chroma saturation signal is smaller than the set value ST while to output '0' otherwise. The maximum set value of chroma saturation ST is defined as 10 in the present embodiment, which value corresponds to the color temperature of 4000K (Kelvin) for the signals in yellowish white. That is, the present embodiment is intended for detecting the signals in the white attributes, the color temperature of which signals is 4000K or more, to which value it is not necessarily limited, but may adopt other value in an arbitrary manner. Further, the same set value of the color temperature may be applied to the whole hue whereas the different set value thereof may be applied to the specific range of hue. For instance, the set value of the color temperature for the signals in bluish white may be 20000K.

Both the high luminance level detection signal and the low chroma saturation level detection signal are input to the switching control circuit 173, which circuit performs an AND operation on those detection signals so as to determine whether the input video signals are those in the white attributes having a given luminance or above and a given chroma saturation or below, in other words, those in very bright and very dim white. In short, the switching control circuit 173 discerns whether the input video signals exist within a cylindrical area drawn with the slanting lines as shown in FIG. 6, which area belongs to the signals in the white attributes, and outputs a flag signal '1' when the input video signal is within the same area, which means that those two detection signals amount to '1' while outputting a flag signal '0', when it is out of the same area, which means that either of them or both of them amount to '0'. Either of those flag signals is supplied to the first and second selection circuits 232 and 236 of the color temperature correction circuit 23 for the purpose of controlling the same selection circuits.

The detection circuit 17 according to the present embodiment detects the video signals having chroma saturation of the maximum set value thereof ST or less as well as luminance of the minimum set value thereof YB or more, which circuit allows not only the signals in pure white, but also those in the white attributes with the slight mixture of other color as well as in the white attributes of lower luminance with the slight mixture of gray. The minimum set value of luminance YB and the maximum set value of chroma saturation ST that are the criteria for detecting the signals in the white attributes are designated by the microcomputer 40, which allows the range of the signals in the white attributes as required to be designated in an arbitrary and high precision manner. Further, such sufficiently colored picture area as a human skin, the chroma saturation signal of which area is large in amplitude level and the luminance signal of which area is not of extreme largeness, can be excluded from the detection range of the signals in the white attributes depending on the set values of ST and YB.

Figure 7:
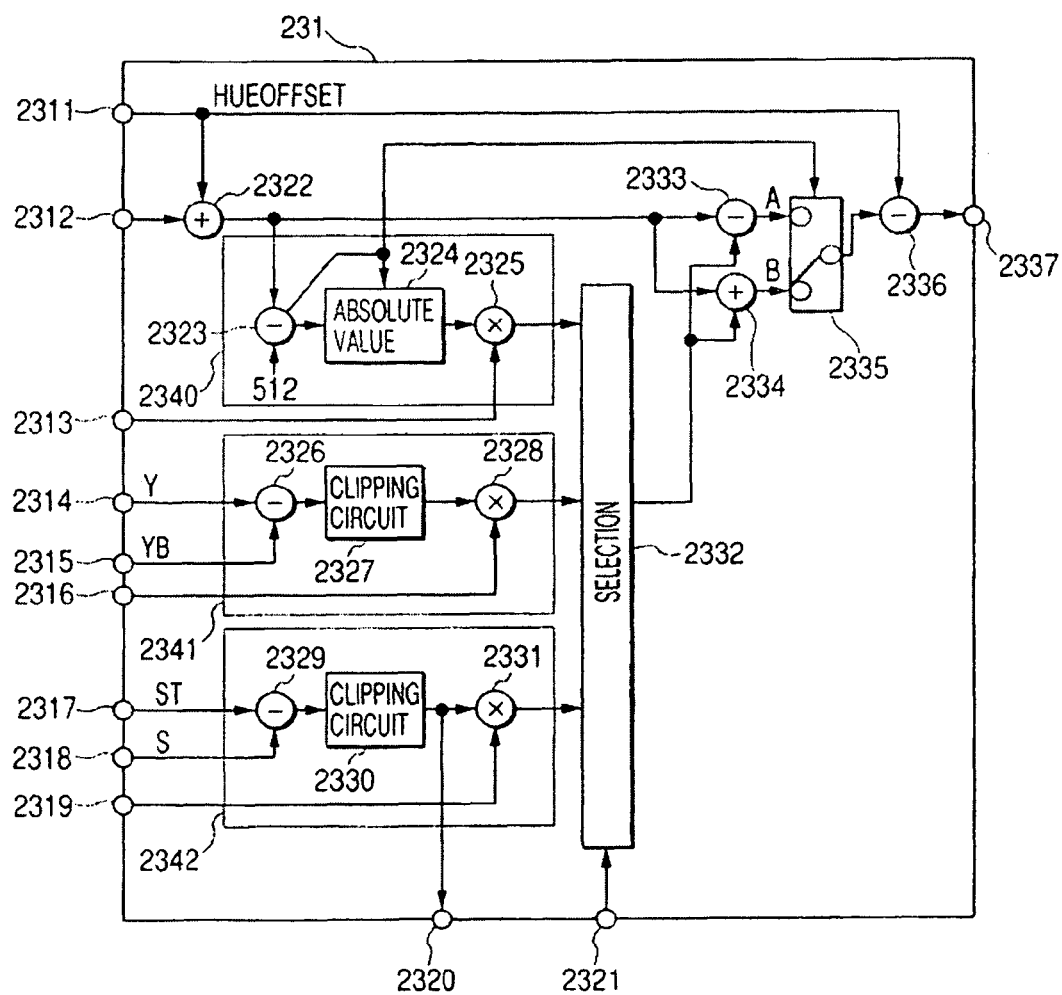
FIG. 7 is a block diagram to show the details of the first color temperature correction section 231.

Then, the color temperature correction circuit 23 is described below in details with reference to FIGS. 7 through 11. Firstly, a first color temperature correction section 231 to perform the color temperature correction of the hue signal is described with reference to FIGS. 7 through 10. The first color temperature correction section 231 is arranged such that it takes a hue indicated with the vector 801 in FIG. 8A (hue of blue herein) as a reference hue and generates a hue shift coefficient that aggregates to the same reference hue its peripheral hue. FIG. 7 shows one example of the circuit arrangement thereof.

In FIG. 7, the corrected hue signal as output from the adder 202 of the hue correction circuit 20 is input to a hue input terminal 2312 of the first color temperature correction section 231, which corrected hue signal is supplied to one terminal of an adder 2322. To the other terminal of the adder 2322, the hue offset value (HUEOFFSET) as set by the microcomputer 40 is input through a hue offset input terminal 2311, which hue offset value is also supplied to one terminal of a subtractor 2336. The adder 2322 adds the corrected hue signal to the hue offset value wherein the hue offset value as set by the microcomputer 40 is equal to the difference T between the digitalized value '1024' and the hue value é of the reference vector 801 as shown in FIG. 8A, which offset value is found by the following equation, for instance.

$$HUEOFFSET(T)=1024-(353/360)\cdot 1024=20$$

Thus, the adder 2322 outputs the digitalized value '0' as shown in FIG. 8B with a vector 802, when a signal having the hue value of the vector 801 is input thereto. This indicates that the vector 801 has counterclockwise rotated by the value T to the position of the vector 802 on the (B−Y) axis. The hue signal that has rotated by the hue offset value as a whole by the adder 2322 is input to the subtractor 2323 comprising a first hue shift coefficient generation circuit 2340.

Hereafter, the operation of the first hue shift coefficient generation circuit 2340 is described. The subtractor 2323 outputs a hue signal with 512 subtracted from the hue signal as output from the adder 2322. At the same time, the subtractor 2323 outputs the digitalized value '1' as a code signal when the subtraction turns out to be positive while outputting the digitalized value '0' otherwise. The hue signal as subtracted and output as well as either one of those code signals are input to an absolute value circuit 2324, which circuit outputs the input signal as it is when the subtraction turns out to be positive while otherwise subjecting the input signal to the absolute value operation because of it is negative before outputting the same signal. The hue component as subjected to the absolute value operation at the circuit 2324 is input to a multiplier 2325 and multiplied by a hue multiplication coefficient as input from the microcomputer 40 through an input terminal 2313 so as to be subjected to gain adjustment. The multiplier 2325 outputs the hue component as subjected to the gain adjustment to the first input terminal of a selection circuit 2332. In this way, the first hue shift coefficient generation circuit 2340 is arranged such that it generates such a hue shift coefficient as rendering the smallest degree of hue shift the hue that is dislocated by 180° from the hue value in the vicinity of blue corresponding to the vector 801 as shown in FIG. 8A and as set by the microcomputer 40 or by 512 in the terms of the digitalized value and rendering the degree of hue shift greater as the hue gets nearer to the same hue value as dislocated by 180° therefrom. This hue shift coefficient is subjected to the gain adjustment by the multiplier 2325. The hue multiplication coefficient for this gain adjustment is adjustable by the microcomputer 40.

Figure 10A:
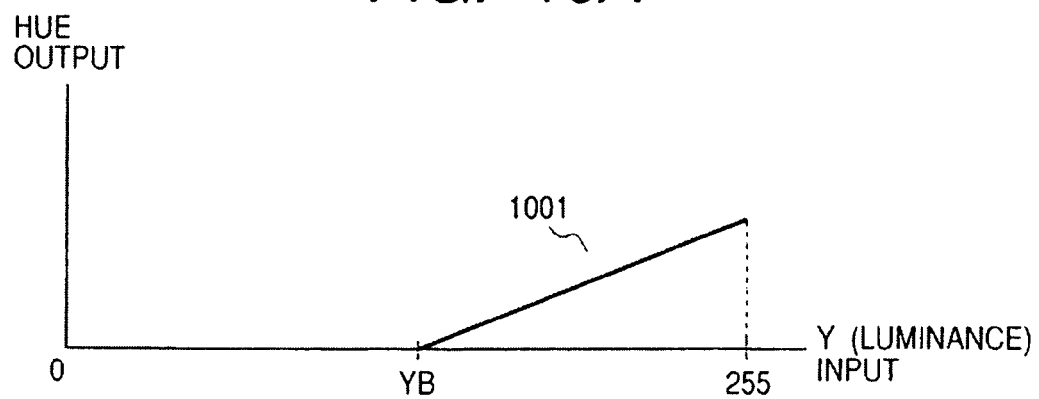
FIG. 10 is a view to show the input and output characteristics of the second and third hue shift coefficient generation circuits 2341 and 2342.

The second hue shift coefficient generation circuit 2341 outputs a differential signal with the luminance signal Y greater than the minimum set value of luminance YB that is used for detecting the signals in the white attributes in the aforementioned detection circuit 17. This generation circuit renders the level of this differential signal null when the luminance signal is smaller than the minimum set value of luminance YB and generates a hue shift coefficient in proportion to the largeness of this differential signal. The gain adjustment for this hue coefficient is also operable by the microcomputer 40. Hereafter, the second hue coefficient generation circuit 2341 is described in details. The luminance signal Y as output from the aforementioned matrix-conversion circuit 15 is supplied through a luminance input terminal 2314 to a subtractor 2326, to the other input terminal 2315 of which subtractor the minimum set value of luminance YB is supplied. This subtractor subtracts the set value of luminance YB from the luminance signal Y so as to output a differential signal, which differential signal is supplied to a clipping circuit 2327, which circuit clips off the negative value of the input luminance differential signal into null so as to output a positive differential signal. The signal as output from this clipping circuit is input to a multiplier 2328 and is multiplied by the luminance multiplication coefficient as input from the microcomputer 40 so as to be subjected to the gain adjustment. The multiplier 2328 outputs the luminance component as subjected to the gain adjustment to the second input terminal of the selection circuit 2332 as a hue shift coefficient. The straight line 1001 of FIG. 10A shows the input and output characteristics of the second hue shift coefficient generation circuit 2341. It is a luminance multiplication coefficient that adjusts the inclination of the straight line 1001. As described above, the second hue shift coefficient generation circuit 2341 outputs a hue shift coefficient that becomes greater in value as the level of luminance signal becomes greater where the level thereof is at the minimum set value of luminance YB or more. To note, where the level thereof is at the minimum set value of luminance YB or less, the generation circuit outputs the digitalized value of 0 wherein the degree of hue shift is also 0.

Figure 10B:
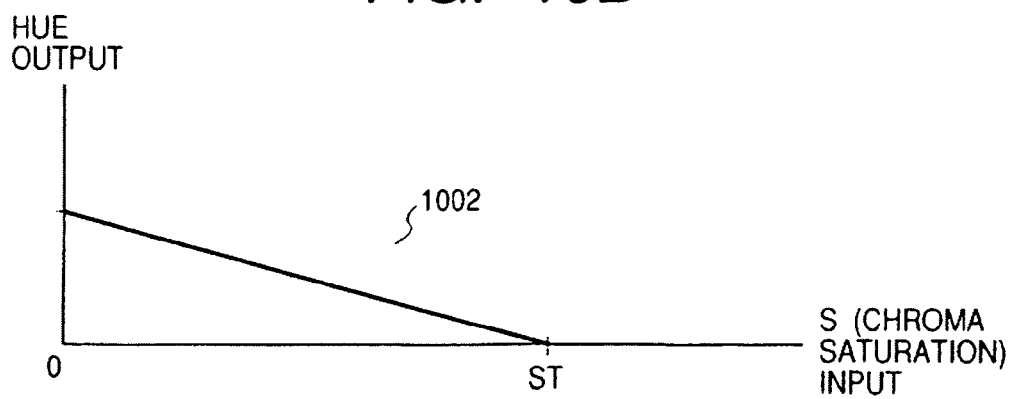

The third hue shift coefficient generation circuit 2342 generates a hue shift coefficient on the basis of a differential signal with the chroma saturation signal that is smaller than the maximum set value of chroma saturation ST as used for detecting the signals in the white attributes in the aforementioned detection circuit 17. This differential signal amounts to null together with the degree of hue shift when the chroma saturation signal is greater than the maximum set value of chroma saturation ST. Hereafter, the third hue shift coefficient generation circuit 2342 is described in details. The corrected chroma saturation signal as output from the multiplier 221 of the aforementioned chroma saturation correction circuit is supplied through a chroma saturation input terminal 2318 to one input terminal of a subtractor 2329, to the other terminal of which subtractor the maximum set value of chroma saturation ST is supplied through an input terminal 2317. The subtractor 2329 subtracts the maximum set value ST from the corrected chroma saturation signal so as to output a differential signal as obtained to a clipping circuit 2330, which circuit clips off the negative value of the input differential signal into null so as to output a positive differential signal only. The differential signal as output from the clipping circuit 2330 is input to a multiplier 2331, which multiplier multiplies this differential signal by a chroma saturation multiplication coefficient as supplied through an input terminal 2319 from the microcomputer 40 so as to perform the gain adjustment. The chroma saturation component as subjected to the gain adjustment by the multiplier 2331 is supplied to a third input terminal of the selection circuit 2332. The straight line 1002 of FIG. 10B shows the input and output characteristics of the third hue shift coefficient generation circuit 2342. The inclination of the straight line 1002 is adjusted by a chroma saturation multiplication coefficient. In this way, where the level of chroma saturation signal is smaller than the maximum set value of chroma saturation ST, the third hue shift coefficient generation circuit 2342 generates a hue shift coefficient that becomes greater in value as the level thereof becomes smaller. Otherwise, the same circuit outputs the digitalized value of 0 wherein the degree of hue shift also amounts to null.

Figure 9A:
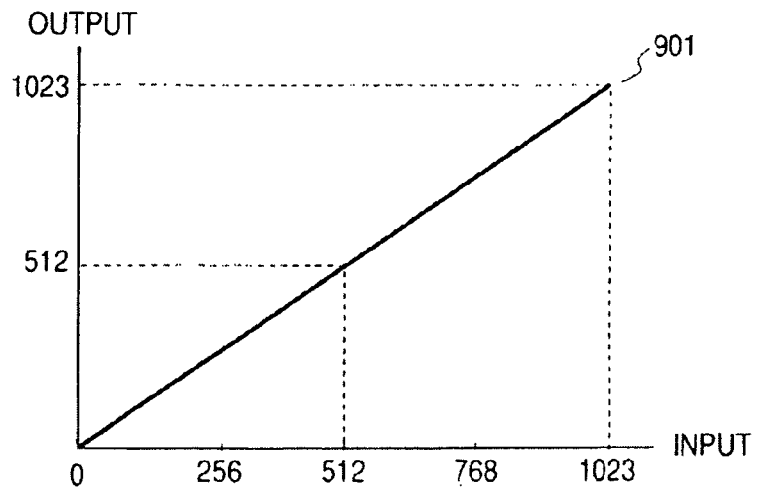
FIG. 9 is a view to show the input and output characteristics of the respective sections of the first color temperature correction section 231.
Figure 9B:
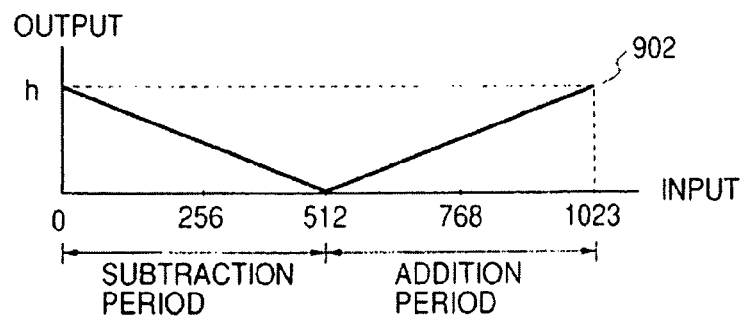
Figure 9C:
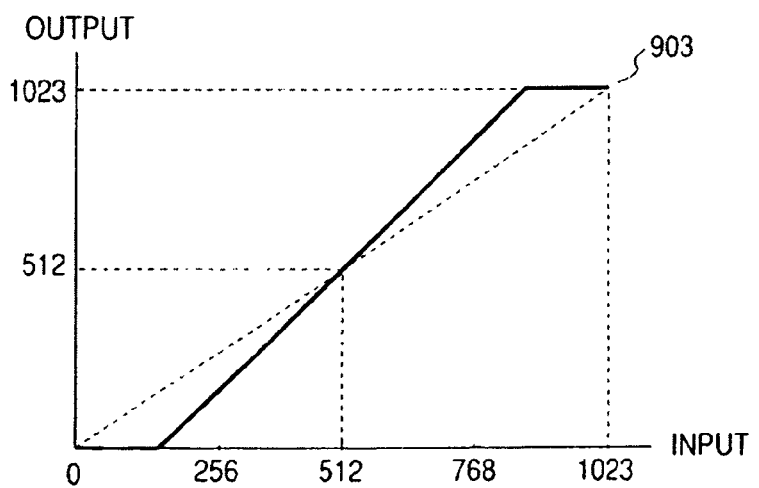

The selection circuit 2332 selects a signal having either the maximum degree of hue shift or the minimum degree thereof from the signal as input to the first terminal thereof (or as output from the first hue shift coefficient generation circuit 2340), that as input to the second terminal thereof (or as output from the second hue shift coefficient generation circuit 2341) and that as input to the third terminal thereof (or as output from the third hue shift coefficient generation circuit 2342 so as to output the same signal. The selection operation thereof by means of the selection circuit 2332 is controlled in accordance with a switching control signal as input thereto through an input terminal 2321 from the microcomputer 40. In order to facilitate the explanation on the processing of the signal as selected by the selection circuit 2332, it is described below with reference to FIG. 9 on the assumption that the same circuit selects the signal as input to the first terminal thereof. FIG. 9 shows the input and output characteristics of the respective sections of the first color temperature correction section 231. FIG. 9A shows the input and output characteristics of an adder 2322 wherein the hue offset value amounts to null. FIG. 9B shows the input and output characteristics of the first hue shift coefficient generation circuit 2340 while FIG. 9C showing that of a switching circuit 2335.

The hue component as output from the multiplier 2325 is input through the selection circuit 2332 to a subtractor 2333 and an adder 2334. The hue signal as output from the adder 2322 is input to the subtractor 2323 as well as to the subtractor 2333 and the adder 2334. The subtractor 2333 subtracts the signal as output from the selection circuit 2332 from the hue signal as output from the adder 2322. If the subtraction result turns out to be negative, it is clipped off into null by an integrated clipping circuit, which is not shown in the drawings, so as to be output to an input terminal A of the switching circuit 2335. Then, the adder 2334 adds the hue signal as output from the adder 2322 to the signal as output from the selection circuit 2332. If the addition result turns out to be over 1023, it is clipped off into the maximum value of 1023 by an integrated clipping circuit, which is not shown in the drawings, so as to be output to an input terminal B of the switching circuit 2335. When the value of the code signal as output from the subtractor 2323 amounts to 1 or the subtraction result turns out to be positive, the switching circuit 2335 selects and outputs the signal as input to the terminal B while amounting to 0 or the subtraction result turns out to be negative, the same circuit selects and outputs the signal as input to the terminal A.

That is, the subtractor 2333 subtracts the signal as shown in FIG. 9A with a waveform 901 together with that as shown in FIG. 9B with a waveform 902 during the subtraction period of FIG. 9B or within the output range of the adder 2322 from 0 to 512 and outputs the subtraction result to the input terminal A of the switching circuit 2335. In turn, the adder 2334 adds the signal as shown in FIG. 9A with a waveform 901 to that as shown in FIG. 9B with a waveform 902 during the addition period of FIG. 9B or within the output range of the adder 2322 from 513 to 1023 and outputs the addition result to the input terminal B of the switching circuit 2325. The switching circuit 2335 switches over to and outputs either one of the signal as input to the terminal A (as output from the subtractor 2333) and that as input to the terminal B (as output from the adder 2334) according to the code signal as output from the subtractor 2323. That is, the same circuit selects the signal as input to the terminal A within the output range of the adder 2322 from 0 to 512 while selecting that as input to the terminal B within that from 513 to 1023. As the result of it, the switching circuit 2335 outputs a signal as shown in FIG. 9C with a waveform 903 wherein the hue has rotationally moved to the direction of 0. The rotational movement of the hue is shown in FIGS. 8C and D. A waveform 803 of FIG. 8C shows the state where the rotational movement of the hue becomes greater as the hue gets nearer to the (B−Y) axis.

The state where the hue rotationally moves is described below with concrete numerical values in use, given that the hue offset value is 0 and the multiplication coefficient to be multiplied by the multiplier 2325 is 1.

Where the corrected hue signal amounts to 10 in value or has a hue closer to blue, the subtractor 2323 performs the operation of 10−512 and outputs −502 as the result of the operation while outputting 0 as the code signal thereof. The absolute value circuit converts −502 into 502 so as to output the same to the subtractor 2333 and the adder 2334. The subtractor 2333 performs the operation of 10−502, which results in being negative or −492, so as to output 0 to the terminal A of the selection circuit 2335. On the other hand, the adder 2334 performs the operation of 10+502, which results in being 512, so as to output the same result to the terminal B thereof. The selection circuit 2335 selects and outputs the signal as input to the terminal A or 0 as the code signal as output from the subtractor 2323 is 0.

Where the corrected hue signal amounts to 600 or has a hue comparatively closer to yellow, the subtractor 2323 performs the operation of 600−512 and outputs 88 as the result of the operation while outputting 1 as the code signal thereof. The absolute value circuit outputs 88 as it is and supplies the same to the subtractor 2333 and the adder 2334. The subtractor 2333 performs the operation of 600−88 and outputs 512 as the result of the operation to the terminal A of the selection circuit 2335. On the other hand, the adder 2334 performs the operation of 600+88 and outputs 688 as the result of the operation to the terminal B thereof. The selection circuit 2335 selects and outputs the signal as input to the terminal B or 688 as the code signal as output from the subtractor 2323 is 1.

As described above, the present embodiment is arranged such that the color temperature of the hues more distinct from blue increases with the smaller degree of shift so as not to change the hues to great extent while bring arranged such that the hues close to blue have the larger degree of shift so as to come much closer to blue.

FIG. 8D shows the rotational movement of the hues as made by a subtractor 2336, which subtractor moves rotationally and clockwise by the hue offset value the waveform 803 as shown in FIG. 8C.

The first color temperature correction section 231 is intended for rotationally moving the hue of the color difference signals having a given luminance (the minimum set value of luminance YB) or more and a given chroma saturation (the maximum set value of chroma saturation ST) or less to the direction of blue color for the purpose of increasing the color temperature of the same signals.

In the above explanation of the first color temperature correction section 231, the case is exemplified where the selection circuit 2332 selects the signal as output from the first hue shift coefficient generation circuit 2340, but it ma be where it selects the signal as output from either the second hue shift coefficient generation circuit 2341 or the third hue shift coefficient generation circuit 2342. It may be also prearranged that the selection circuit 2332 selects one of the signals as output from the three hue shift coefficient generation circuits in an arbitrary manner wherein the signal as selected by the selection circuit is limited to one kind of them irrespective of the scale and state of the signal as input to the selection circuit 2332. Further, the selection circuit 2332 may be arranged such it selects the signal of the maximum output level among the signals as output from three or two hue shift coefficient generation circuits of arbitrary choice whereas it may be arranged such that it selects the signal of the minimum output level among the signals as output from three or two hue shift coefficient generation circuits of arbitrary choice.

Figure 11:
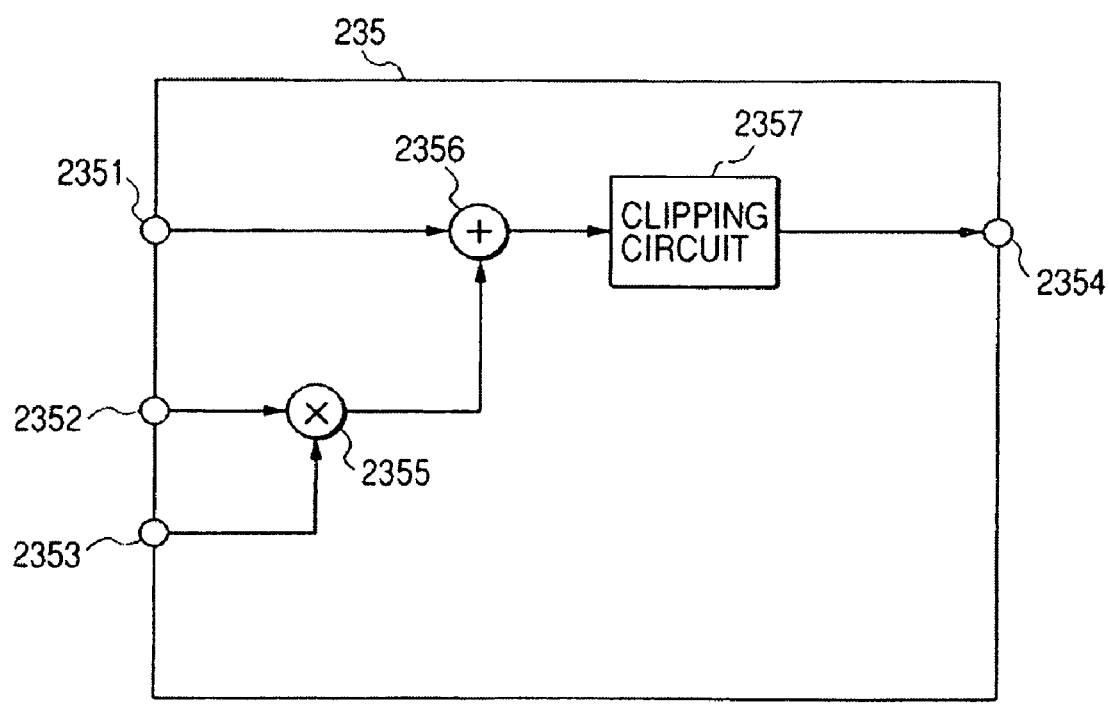
FIG. 11 is a block diagram to show the details of the second color temperature correction section 235.
Figure 12A:
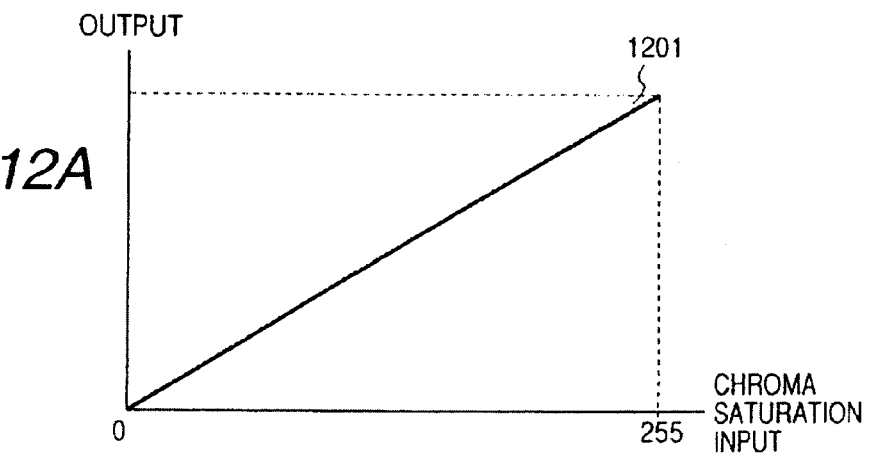
FIG. 12 is a view to show the input and output characteristics of the respective sections of the second color temperature correction section 235.
Figure 12B:
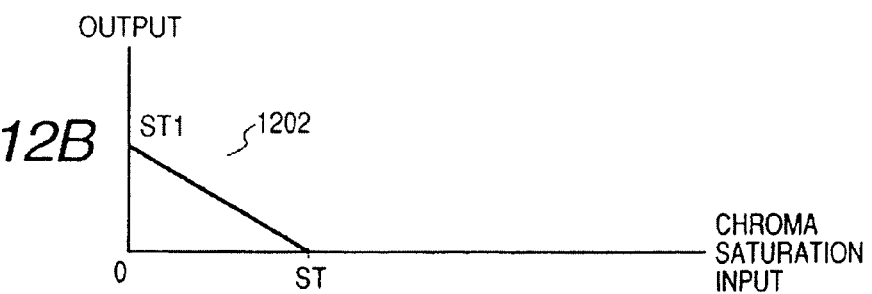
Figure 12C:
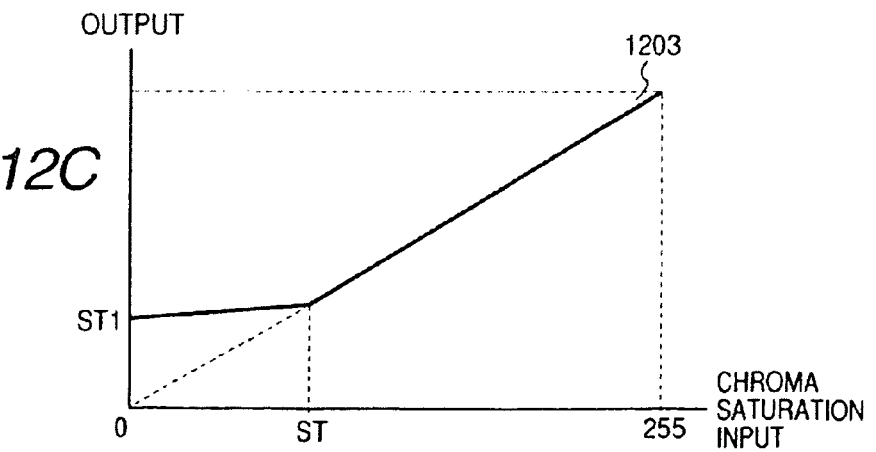

Then, one example of the second color temperature correction section 235 is described in details with reference to FIGS. 11 and 12. The corrected chroma saturation signal as output from the multiplier 221 of the aforementioned chroma saturation circuit 22 is input through a chroma saturation terminal 2351 to one terminal of an adder 2356. The chroma saturation differential signal is output from the terminal 2320 of the first color temperature correction section 231, which differential signal is input through a terminal 2352 to one terminal of a multiplier 2355, to the other terminal of which a multiplication coefficient as output from the microcomputer 40 is input through a terminal 2353. The multiplier 2355 multiplies the chroma saturation differential signal by the multiplication coefficient so as to perform the gain adjustment of the differential signal. The chroma saturation differential signal as subjected to the gain adjustment by the multiplier 2355 is input to the other terminal of the adder 2356, which adder adds the corrected chroma saturation signal to the chroma saturation differential signal as subjected to the gain adjustment so as to output the addition result to a clipping circuit 2357. The clipping circuit 2357, where the addition result by the adder 2356 overflows, clips off the same result at a given maximum value. The signal as output from the same circuit is supplied through a chroma saturation coefficient output terminal 2354 to the other terminal of the switching circuit 236. FIG. 12 shows the input and output characteristics of the respective sections of the second color temperature correction section 235. FIG. 12A shows the same characteristics with a straight line 1201 when the chroma saturation differential signal amounts to 0 in which no addition is made to the corrected chroma saturation signal at the adder 2356. In this case, the second color temperature correction section outputs the corrected chroma saturation signal as output from the chroma saturation terminal 2351. FIG. 12B shows the input and output characteristics of the multiplier 2355 with a straight line 1202. As clear from this drawing, the multiplier 2355 outputs a signal of the maximum level (ST1) when the chroma saturation signal amounts to 0 while outputting a signal of smaller level as the chroma saturation signal gets larger in value. FIG. 12C shows the input and output characteristics of the second color temperature correction section wherein the characteristics thereof is shown therein with a kinked line when the signal as output from the multiplier 2355 is added to the corrected chroma saturation signal by the adder 2356.

As described above, the second color temperature correction section 235 performs the color temperature correction on the chroma saturation signal, which section is intended for increasing the chroma saturation of the signals having a given chroma saturation (the maximum set value of chroma saturation ST) or less so as to make denser in blue the signals in the white attributes whose hue is shifted to the direction of blue color by means of the first color temperature correction section 231 and to render the pictures on disply vividly in white color. This color temperature correction is effective for the case where the chroma saturation level of blue color is originally lower. Such correction for enhancing the chroma saturation thereof is not required for the white color with higher chroma saturation level of blue color (blue enough to be discernible) and/or that intense in warm colors attributes.

When the flag signal as output from the detection circuit 17 corresponds to 1 or where the input signal of high luminance and low chroma saturation is detected, the first selection circuit 232 selects and outputs the signal as output from the first color temperature correction section 231. On the other hand, when the flag signal corresponds to 0 or where the input signal out of high luminance and low chroma saturation is detected, the first selection circuit 232 selects and outputs the signal as output from the hue correction circuit 20. In synchronization with this selection control, when the flag signal corresponds to 1, the second selection circuit 236 selects and outputs the signal as output from the second color temperature correction section 235 while selecting and outputting the signal as output from the chroma saturation correction circuit 22 when the flag signal corresponds to 0. In the above arrangement, the hue signals and the chroma saturation signals are output, which signals are obtained by shifting the hue of only the signals within the range of the color temperature correction (or within the range of those in the white attributes) and by correcting the chroma saturation thereof.

The signals as output from the first and second selection circuits 232 and 236 are, as described above, converted into the color difference signals by the color difference conversion circuit 26, which signals are converted into the three primary colors signals of R, G and B so as to be supplied to the display device 28. On the display device 28, the pictures as subjected to the color temperature correction in an optimum manner according to the input signals are displayed.

In the present embodiment, the color temperature correction is performed on the signals in the white attributes of a given luminance or more and a given chroma saturation or less, which correction is performed on the hue signals and the chroma saturation signals respectively in the digitalized manner so that a more highly precise color temperature correction is realized. Further, the degree to which and the range within which the color temperature is corrected is designated by the microcomputer, which allows such degree and range to be adjusted in an arbitrary manner.

Figure 14:
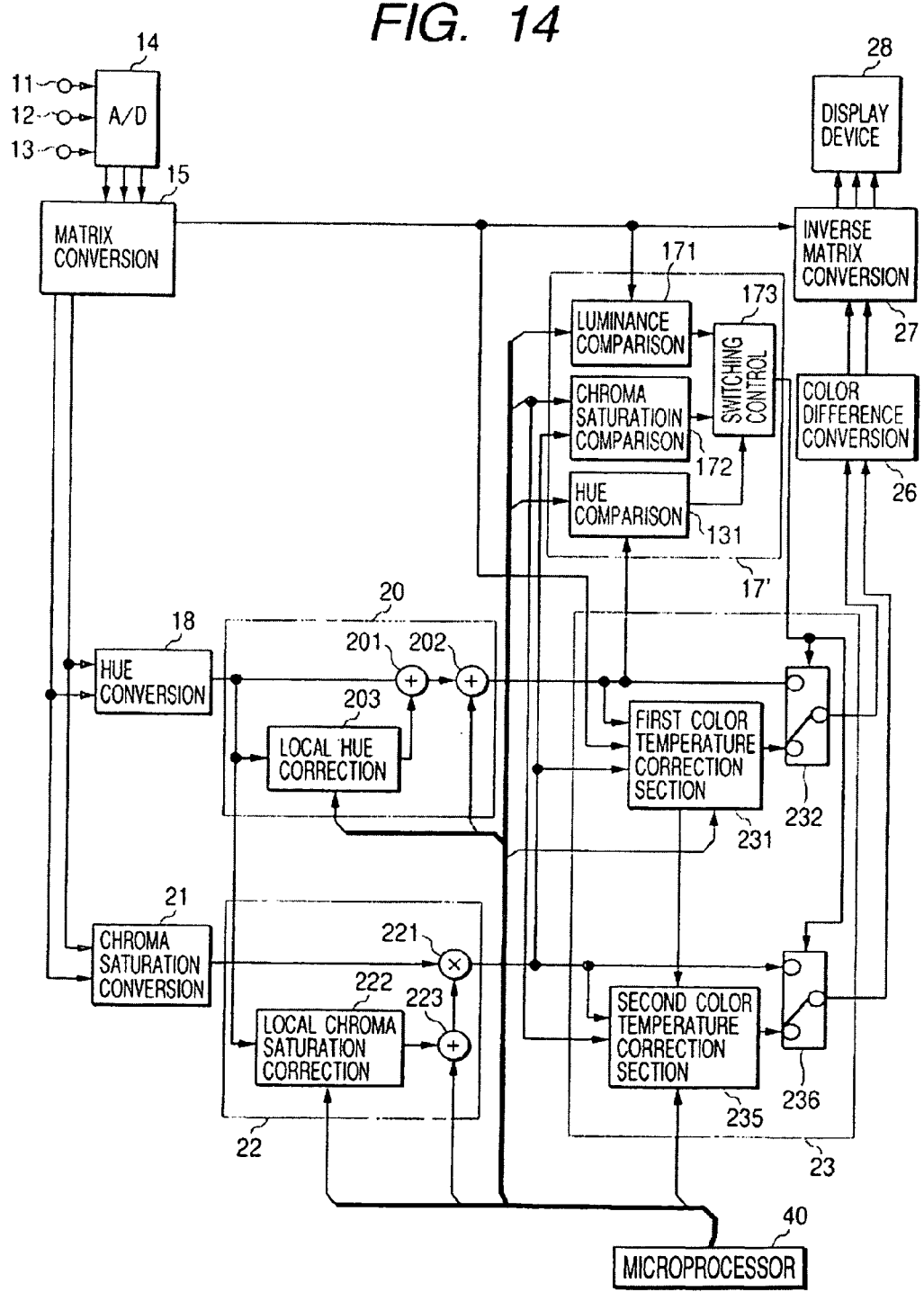
FIG. 14 is a block diagram to show another embodiment of the present invention.
Figure 15:
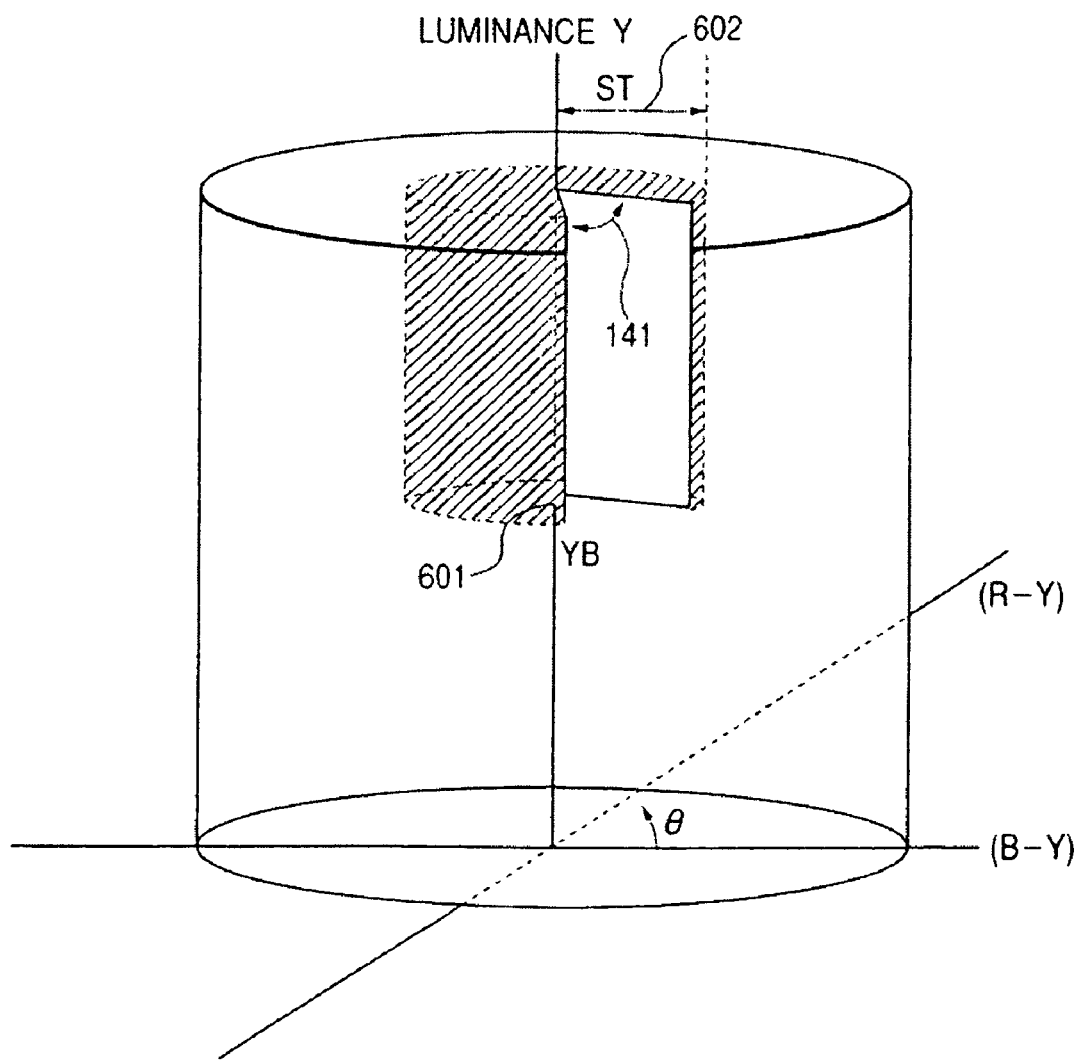
FIG. 15 is a view to show the range of the signals belonging to the white attributes as detected by the detection circuit 17'.

FIG. 14 is a block diagram to show another embodiment of the present invention, in which the same references are used for the same elements as shown in FIG. 1 to avoid redundancy. FIG. 15 a view to supplement FIG. 14. The difference in FIG. 14 with the embodiment as shown in FIG. 1 lies in that a hue comparison circuit 131 is added to the structural elements of the color temperature correction level detection circuit 17. The detection circuit with the addition of this hue comparison circuit is referred to as 17', which comparison circuit performs the operation to detect the signals of a given hue among those in the white attributes of a given luminance or more and a given chroma saturation or less so as to exclude the signals of the given hue from the color temperature correction. Hereafter, the arrangement thereof is described below.

To one terminal of the hue comparison circuit 131, the corrected hue signal as output from the hue correction circuit 20 is input, to the other terminal of which a hue set value as output from the microcomputer and within the range as shown in hue 141 of FIG. 15, for instance, is input. This hue set value is intended for designating the range of hue to be excluded from the color temperature correction, which value has two values representing the initial end and the ultimate end thereof. The hue comparison circuit 131 compares the corrected hue signal with the hue set value and outputs 0 when the corrected hue signal is within those two values while outputting 1 when it is out of those values (or within the range as shown with slanting lines in FIG. 15). The switching control circuit 173, to which the signals as output from the luminance comparison circuit 171, the chroma saturation comparison circuit 172 and the hue comparison circuit 131 are input, performs the AND operation of those three signals so as to output a flag signal for controlling the selection circuits 232 and 236. That is, when the luminance comparison circuit 171 detects a signal of high luminance so as to output 1 and the chroma saturation comparison circuit 172 detects a chroma saturation signal of low chroma saturation so as to output 1 and the hue comparison circuit 131 detects a signal out of the hue set values so as to output 1, the switching control circuit 173 outputs a flag signal corresponding to 1 to the selection circuits 232 and 236 so that those circuits select the signals as output from the first and second color temperature correction sections 231 and 235. On the other hand, when the luminance comparison circuit 171 together with the chroma saturation comparison circuit 172 output 1 while the hue comparison circuit 131 detects a signal within the range of the hue set values so as to output 0, the switching control circuit 173 outputs a flag signal corresponding to 0. Accordingly, because the input signals are out of the range for the color temperature correction, though those signals are of high luminance and an low chroma saturation so as to belong to the white attributes, the selection circuits 232 and 236 select the signals as output from the hue correction circuit 20 and the chroma saturation correction circuit 22, which signals are not subjected to the color temperature correction.

The present embodiment allows the signals in the white attributes within the range of the designated hue not to be subjected to the color temperature correction. This leads to the restriction of the range of hue on which the color temperature correction is performed, which excludes the signals having a hue that is undesirable to change from the correction of such hue. Further, the range for the color temperature correction is designated by the microcomputer, which range is adjustable in an arbitrary manner.

Figure 16:
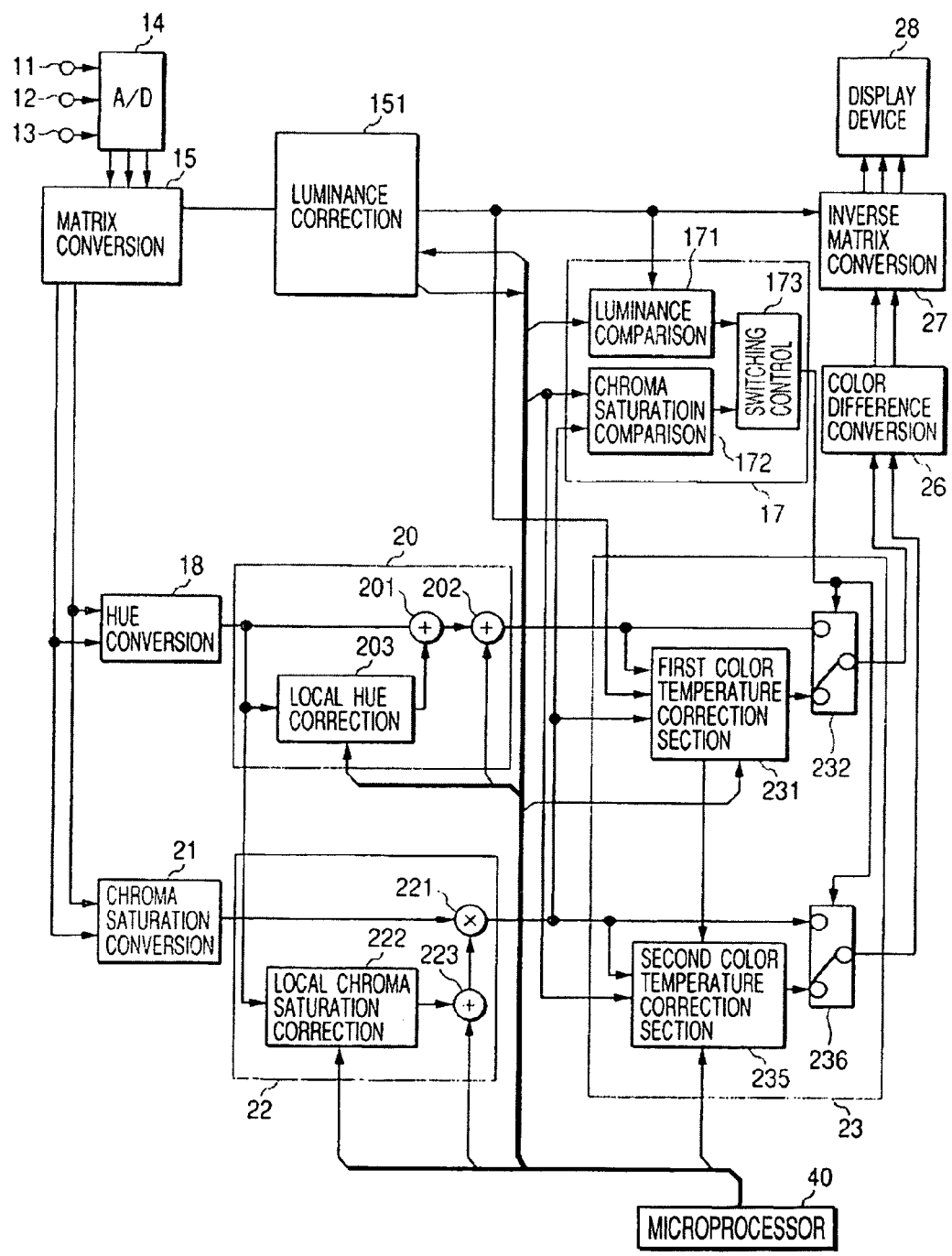
FIG. 16 is a block diagram to show another embodiment of the present invention.

FIG. 16 is a block diagram to show another embodiment of the present invention. The difference in FIG. 16 with the embodiment as shown in FIG. 1 lies in that a luminance correction circuit 151 is provided therein.

In the following description, the same references are used for the same structural elements as shown in FIG. 1 to avoid redundancy.

Figure 17:
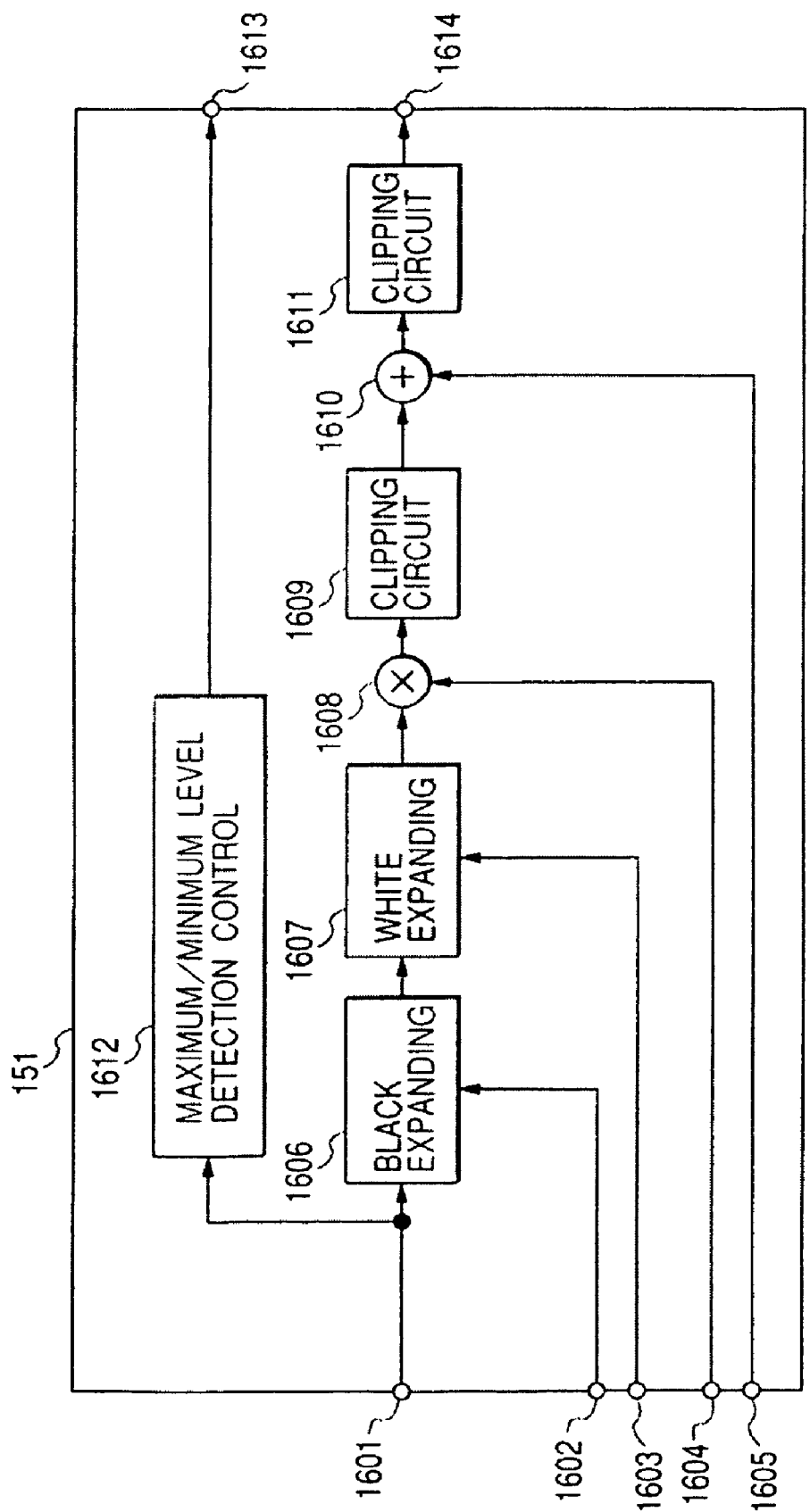
FIG. 17 is a block diagram to show the details of the luminance correction circuit 151.
Figure 18A:
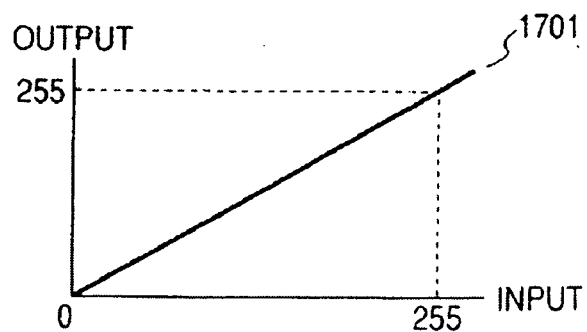
FIG. 18 is a view to show the input and output characteristics of the respective sections of the luminance correction circuit 151.
Figure 18B:
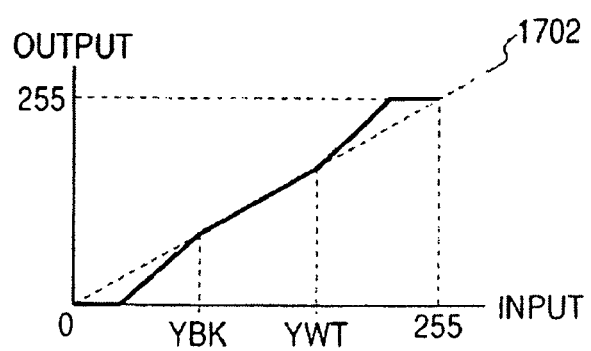
Figure 18C:
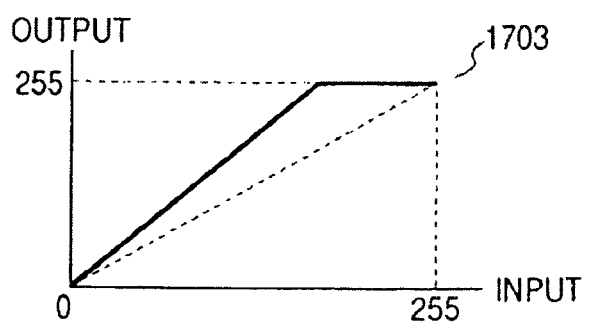
Figure 18D:
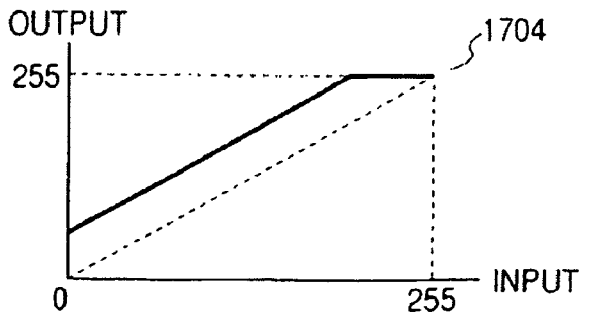

The luminance correction circuit 151 is intended for variably controlling the amplitude and direct current level of the luminance signal as separated from the input picture signals by the matrix conversion circuit 15, the detailed view of which circuit is shown in FIG. 17. The luminance signal Y as output from the matrix conversion circuit 15 is supplied to one input terminal of a black expanding circuit 1606, to the other terminal of which circuit the maximum set value of black expanding YBK and the gain coefficient as set by the microcomputer 40 are supplied through an input terminal 1602. The black expanding circuit 1606 variably controls the amplitude of the luminance signal having the maximum set value of black expanding YBK or less so as to output the same signal to one terminal end of a white expanding circuit 1607, to the other terminal end of which circuit the minimum set value of white expanding YWT and the gain coefficient as set by the microcomputer 40 are supplied through an input terminal 1603. The white expanding circuit 1607 variably controls the amplitude of the luminance signal having the minimum set value YWT or more so as to supply the same signal as subjected to the amplitude control to a multiplication circuit 1608, which circuit multiplies the same signal by a contrast control coefficient as input through a terminal 1604 from the microcomputer 40 so as to variably control the amplitude thereof or subject the same signal to contrast control. A clipping circuit 1609, where the signal as output from the multiplication circuit 1608 overflows, clips off the overflowed portion thereof at the maximum value of 255 in 8 bits precision so as to output the same signal, which signal is input to an addition circuit 1610. The addition circuit 1610 adds the signal as input thereto to a direct current (DC) value as input through a terminal 1605 from the microcomputer 40 so as to subject the same signal to brightness control. A clipping circuit 1611, where the signal as output from the addition circuit 1610 overflows, clips off the overflowed portion thereof at the maximum value of 255 in 8 bits precision. The signal as output from the clipping circuit 1611 is output through a luminance output terminal 1614 to the inverse matrix conversion circuit 27, the detection circuit 17 and the color temperature correction circuit 23. Further, a maximum/minimum level detection circuit 1612 detects the maximum and minimum level of the luminance signal as input through a terminal 1601 before the same signal is subjected to the luminance correction and outputs the result to the microcomputer 40. The microcomputer 40 performs the operation of the maximum set value of black expanding YBK and the gain coefficient as input to the black expanding circuit 1606, the minimum set value of white expanding YWT and the gain coefficient as input to the white expanding circuit 1607, the contrast control coefficient as input to the multiplication circuit 1608 and the direct current value as input to the addition circuit 1610 so as to determine the same values.

FIG. 18 is a view to give the supplemental explanation of the operation of the luminance correction circuit 151 as mentioned above and shows the input and output characteristics thereof. A waveform 1701 of FIG. 18A shows the output characteristics of the luminance signal as not subjected to the luminance correction, in which the same signal as input from the terminal 1601 is output without any correction made thereto. A waveform 1702 of FIG. 18B shows the output luminance signal, the black and white portions of which signal are expanded by the black and white expanding circuits 1606 and 1607. In the waveform 1702, the portion thereof as processed by the black expanding circuit 1606 corresponds to the continuous line of the set value YBK or less as subjected to the gain adjustment while the portion thereof as processed by the white expanding circuit 1607 corresponding to the continuous line of the set value YWT or more as subjected to the gain adjustment. A waveform 1703 of FIG. 18C shows the input luminance signal, which signal is subjected to the contrast control operation by the multiplier 1608 and the clipping circuit 1609. In this drawing, for the facility of understanding, the black and white expanding characteristics thereof are not shown. A waveform 1704 of FIG. 18D shows the output luminance signal where the same signal as shown with the waveform 1701 is subjected to the brightness control operation by the adder 1610 and the clipping circuit 1611. In this drawing, the black and white expanding as well as the contrast control characteristics thereof are not show for the facility of understanding.

As described above, in the present embodiment, not only the luminance control of the luminance signal (or contrast control) and the direct current level control thereof (or brightness control) are performed, but also the gray scale control of the high-level luminance signal (or white expanding control) and that of the low-level luminance signal (or black expanding control) are performed, which allows the luminance signals vivid and rich in gray scale (hereinafter, referred to as corrected luminance signals) to be obtained. Further, the corrected luminance signals are supplied to the detection circuit 17 and the color temperature correction circuit 23 at the same time. Thus, the detection of the color temperature correction area (or the area of the signals in the white attributes) at the detection circuit 17 or 17' with the corrected luminance signals in use correlates with the color temperature correction at the color temperature correction circuit 23 with the same signals in use. Accordingly, the color temperature correction is optimum also for the display device, the picture quality of which becomes better with the luminance correction.

The signal processing circuit including the color temperature correction thereof according to the present invention is described above in details, which processing circuit is used for a direct viewing type or a back projection television receiver as well as for the display or monitoring device of computers. Further, the display device incorporating this signal processing circuit therein is available for not only a cathode ray tube, but also a liquid crystal panel and a plasma display panel (PDP), for instances. Further, according to the kinds of the display devices with the variety of the characteristics such as color reproduction and luminance saturation, it is preferable to alter the parameters such as the minimum set value of luminance YB and the maximum set value of chroma saturation ST relating to the hue and chroma saturation correction, the detection of the area of the signals in white color as well as the color temperature correction by means of the microcomputer 40 where appropriate, which modification is also included in the scope of the present invention. In any of the above three embodiments, the color temperature correction is performed subsequently to the hue correction and the chroma saturation corrections, the order of which may be reversed. Further, the color temperature correction may be performed without performing the hue and chroma saturation corrections.

The present invention allows the hue and chroma saturation of the picture signals of a given range to be corrected in an optimum manner, which allows in particular the color temperature correction of the signals in the white attribute of a given luminance or more and a given chroma saturation or less to be performed with high precision. Further, the color temperature correction is not performed on the signals other than those in the white attributes as designated, which allows the quality deterioration of the pictures having the colors other than the white attribute to abate.

What is claimed is:

1. An image display apparatus comprising:
  a signal processing circuit including a color temperature correction circuit which corrects color temperature of an inputted video signal; and
  a display device to which the video signal subjected to the color temperature correction by the color temperature correction circuit is supplied and which performs display on the basis of the video signal,
wherein:
  the signal processing circuit includes:
    a signal producer which produces a luminance signal, a hue signal, and a color saturation signal from the input video signal; and
    a detector which detects the input video signal as signal of white attributes when the luminance signal from the signal producer is greater than or equal to a first predetermined value and the color saturation signal from the signal producer is less than or equal to a second predetermined value; and
  the color temperature correction circuit includes:
    a first color temperature correcting section to correct the hue signal from the signal producer so as to raise color temperature of the signal of the white attributes when the detector detects the signal of the white attributes; and
    a second color temperature correcting section to correct the color saturation signal from the signal producer so as to raise color saturation of the signal of the white attributes when the detector detects the signal of the white attributes.

2. An image display apparatus according to claim 1, wherein the first color temperature correcting section corrects the hue signal so as to shift the hue signal to the direction of blue.

3. An image display apparatus according to claim 2, wherein:
  the signal producer produces the hue signal as a color vector of the video signal that is represented by coordinates in which a first color-difference signal (B Y) of the input video signal is taken on an x axis and a second color-difference signal (R Y) of the input video signal is taken on a y axis, and an angle θ that makes the x axis with the color vector; and
  a hue correction amount in a case where hue of the signal of the white attributes is away (far) from the hue of blue color in the coordinates is smaller than a hue correction amount in a case where the hue of the signal of the white attributes is close to the hue of blue color.

4. An image display apparatus according to claim 3, wherein a hue correction amount in a case where hue of the signal of the white attributes is shifted by 180 degrees from the hue of blue color in the coordinates is the smallest.

5. An image display apparatus according to claim 1, further including a control circuit to give the correction amount of the hue signal and the correction amount of the color saturation signal to the color temperature correction circuit and to give the first predetermined value and the second predetermined value to the detector.

6. An image display apparatus according to claim 1, wherein:
  the signal processing circuit further includes a hue correcting section to correct a hue signal which is in a predetermined hue range among the hue signals, and a color saturation correcting section to correct a color saturation signal which is in the predetermined hue range among the color saturation signals; and
  the first color temperature correcting section performs correction of a hue signal outputted from the hue correcting section and the second color temperature correcting section performs correction of a color saturation signal outputted from the color saturation correcting section.

7. An image display apparatus according to claim 6, wherein the color temperature correction circuit includes:
  a first selection circuit to select and output either of an output signal from the first color temperature correcting section and a hue signal outputted from the hue correcting section, according to an output signal from the detector; and a second selection circuit to select and output either of an output signal from the second color temperature correcting section and a color saturation signal outputted from the color saturation correcting section, according to the output from the detector.

8. An image display apparatus according to claim 7, wherein the detector outputs a control signal for selecting the output signals from the first and second color temperature correcting sections to the first and second selection circuits when the detector detects the signal of the white attributes.

9. An image display apparatus according to claim 1, wherein the color temperature corrections by the first and second color temperature correcting sections are not performed when hue of the signal of the white attributes falls in a predetermined hue range.

10. An image display apparatus according to claim 1, wherein the signal processing circuit further includes a luminance correcting section to correct the luminance signal.

11. An image display apparatus according to claim 10, wherein the luminance correcting section includes: a black expansion circuit to control an amplitude of a black signal less than or equal to a predetermined black luminance; a white expansion circuit to control an amplitude of a white signal greater than or equal to a predetermined white luminance; a contrast controlling circuit to control an amplitude of an output signal from the white expansion circuit; and a brightness controlling circuit to control a direct-current level of an output signal from the contrast controlling circuit.

12. An image display apparatus comprising:
a signal processing circuit including a color temperature correction circuit which corrects color temperature of an inputted video signal; and
a display device to which the video signal subjected to the color temperature correction by the color temperature correction circuit is supplied and which performs display on the basis of the video signal,
wherein:
the signal processing circuit includes:
a signal producer which produces a luminance signal, a hue signal, and a color saturation signal from the input video signal; and
a detector which detects the input video signal as signal of white attributes when the luminance signal from the signal producer is greater than or equal to a first predetermined value and the color saturation signal from the signal producer is less than or equal to a second predetermined value;
the color temperature correction circuit being adapted to correct the hue signal from the signal producer so as to move the hue signal closer to blue when the detector detects the signal of the white attributes; and
a hue correction amount in a case where hue of the signal of the white attributes is a first hue is less than a hue correction amount in a case where hue of the signal of the white attributes is a second hue closer to the hue of blue color than the first hue.

13. An image display apparatus according to claim 12, wherein the color saturation signal from the signal producer is corrected so as to raise color saturation of the signal of the white attributes when the detector detects the signal of the white attributes.

14. An image display apparatus according to claim 12, wherein a hue correction amount in a case where hue of the signal of the white attributes is shifted by 180 degrees from the hue of blue color in a hue circle is the smallest.

15. An image display apparatus according to claim 12, wherein the correction of the hue signal by the color temperature correction circuit is not performed when hue of the signal of the white attributes falls in a predetermined hue range.

* * * * *